United States Patent
Yamada

(10) Patent No.: US 8,856,196 B2
(45) Date of Patent: Oct. 7, 2014

(54) SYSTEM AND METHOD FOR TRANSFERRING TASKS IN A MULTI-CORE PROCESSOR BASED ON TRIAL EXECUTION AND CORE NODE

(75) Inventor: Kazumi Yamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 616 days.

(21) Appl. No.: 12/742,854

(22) PCT Filed: Feb. 23, 2009

(86) PCT No.: PCT/JP2009/053200
§ 371 (c)(1),
(2), (4) Date: May 13, 2010

(87) PCT Pub. No.: WO2010/010723
PCT Pub. Date: Jan. 28, 2010

(65) Prior Publication Data
US 2010/0262971 A1    Oct. 14, 2010

(30) Foreign Application Priority Data
Jul. 22, 2008  (JP) ................................ 2008-188830

(51) Int. Cl.
*G06F 15/16* (2006.01)
*G06F 11/16* (2006.01)
*G06F 9/50* (2006.01)
*G06F 11/00* (2006.01)

(52) U.S. Cl.
CPC ............ *G06F 9/505* (2013.01); *G06F 11/1641* (2013.01); *G06F 11/004* (2013.01)
USPC ....................................................... 708/104

(58) Field of Classification Search
USPC ....................................................... 708/104
See application file for complete search history.

(56) References Cited

U.S. PATENT DOCUMENTS 4,356,546 A * 10/1982 Whiteside et al. ............... 714/10
4,807,228 A * 2/1989 Dahbura et al. ................ 714/13

(Continued)

FOREIGN PATENT DOCUMENTS

DE   10 2005 037 246 A1   2/2007
JP        10 143380        5/1998

(Continued)

OTHER PUBLICATIONS

Barnes, Kerry et al., Load Balancing on a Multicore Processor Bedae, IEEE RADAR Conference, 2007.*

(Continued)

*Primary Examiner* — Scott L Jarrett
(74) *Attorney, Agent, or Firm* — Oblon, Spivak, McClelland, Maier & Neustadt, L.L.P.

(57) ABSTRACT

A multi core system for allocating a task generated from a control system program to an appropriate CPU core and executing the task includes a trial-execution instructing part configured to cause a second CPU core to trial-execute a task which a first CPU core executes before the multi core system transfers the task from the first CPU core to the second CPU core and causes the second CPU core to execute the task, a determining part configured to determine whether an execution result by the first CPU core matches an execution result by the second CPU core, and an allocation fixing part configured to fix the second CPU core as the appropriate CPU core to which the task is allocated if the determining part determines that the execution result by the first CPU core matches the execution result by the second CPU core.

20 Claims, 12 Drawing Sheets

100

(56) References Cited

U.S. PATENT DOCUMENTS

| | | | |
|---|---|---|---|
| 4,914,570 A * | 4/1990 | Peacock | 718/106 |
| 4,954,945 A * | 9/1990 | Inoue | 718/105 |
| 5,107,420 A * | 4/1992 | Kametani | 718/106 |
| 5,168,566 A * | 12/1992 | Kuki et al. | 718/103 |
| 5,287,508 A * | 2/1994 | Hejna et al. | 718/102 |
| 5,404,521 A * | 4/1995 | Murray | 718/104 |
| 5,410,696 A * | 4/1995 | Seki et al. | 717/149 |
| 5,548,737 A * | 8/1996 | Edrington et al. | 712/200 |
| 5,694,603 A * | 12/1997 | Reiffin | 718/107 |
| 5,870,604 A * | 2/1999 | Yamagishi | 718/105 |
| 5,889,989 A * | 3/1999 | Robertazzi et al. | 718/105 |
| 5,903,717 A * | 5/1999 | Wardrop | 714/12 |
| 5,956,482 A * | 9/1999 | Agraharam et al. | 709/203 |
| 6,182,085 B1 * | 1/2001 | Eichstaedt et al. | 1/1 |
| 6,353,847 B1 * | 3/2002 | Maruyama et al. | 718/105 |
| 6,370,560 B1 * | 4/2002 | Robertazzi et al. | 718/105 |
| 6,625,725 B1 * | 9/2003 | Wu et al. | 712/245 |
| 6,647,408 B1 * | 11/2003 | Ricart et al. | 718/105 |
| 6,816,860 B2 * | 11/2004 | Yamamoto | 707/703 |
| 6,928,566 B2 * | 8/2005 | Nunomura | 713/322 |
| 7,082,601 B2 * | 7/2006 | Ohsawa et al. | 717/149 |
| 7,249,358 B2 * | 7/2007 | Emma et al. | 718/105 |
| 7,360,221 B2 * | 4/2008 | Alverson et al. | 718/108 |
| 7,370,328 B2 * | 5/2008 | Yamada et al. | 718/105 |
| 7,412,353 B2 * | 8/2008 | Borkar et al. | 702/186 |
| 7,480,719 B2 * | 1/2009 | Inoue | 709/226 |
| 7,594,228 B2 * | 9/2009 | Lam | 718/102 |
| 7,610,425 B2 * | 10/2009 | Solomita et al. | 710/260 |
| 7,616,205 B2 * | 11/2009 | Matsumoto | 345/505 |
| 7,739,667 B2 * | 6/2010 | Callahan et al. | 717/128 |
| 7,777,748 B2 * | 8/2010 | Bakalash et al. | 345/505 |
| 7,836,233 B2 * | 11/2010 | Tsunedomi et al. | 710/110 |
| 7,961,194 B2 * | 6/2011 | Bakalash et al. | 345/505 |
| 8,032,888 B2 * | 10/2011 | Vengerov et al. | 718/102 |
| 8,037,350 B1 * | 10/2011 | Aggarwal et al. | 714/11 |
| 8,190,949 B2 * | 5/2012 | Kato | 714/47.1 |
| 8,205,201 B2 * | 6/2012 | Ple | 718/102 |
| 8,429,652 B2 * | 4/2013 | Muthiah et al. | 718/1 |
| 2002/0032754 A1 * | 3/2002 | Logston et al. | 709/219 |
| 2003/0005380 A1 * | 1/2003 | Nguyen et al. | 714/736 |
| 2003/0097370 A1 * | 5/2003 | Yamamoto | 707/104.1 |
| 2003/0131291 A1 * | 7/2003 | Morrison et al. | 714/54 |
| 2004/0215987 A1 * | 10/2004 | Farkas et al. | 713/300 |
| 2005/0137928 A1 * | 6/2005 | Scholl et al. | 705/9 |
| 2005/0166089 A1 * | 7/2005 | Ito et al. | 714/11 |
| 2006/0095911 A1 | 5/2006 | Uemura et al. | |
| 2006/0101465 A1 * | 5/2006 | Kato et al. | 718/100 |
| 2006/0230139 A1 * | 10/2006 | Locke | 709/224 |
| 2007/0074011 A1 * | 3/2007 | Borkar et al. | 712/227 |
| 2007/0288734 A1 * | 12/2007 | Luick | 712/237 |
| 2008/0091974 A1 * | 4/2008 | Nakashima | 714/10 |
| 2008/0098404 A1 * | 4/2008 | Oi et al. | 718/105 |
| 2008/0168466 A1 | 7/2008 | Nitta et al. | |
| 2009/0064166 A1 * | 3/2009 | Arimilli et al. | 718/105 |
| 2009/0217092 A1 | 8/2009 | Weiberle et al. | |
| 2009/0328065 A1 * | 12/2009 | Wookey | 719/315 |

FOREIGN PATENT DOCUMENTS

| | | |
|---|---|---|
| JP | 2005 31736 | 2/2005 |
| JP | 2006 133995 | 5/2006 |
| JP | 2006 185152 | 7/2006 |
| JP | 2007 188212 | 7/2007 |
| WO | 2007 037006 | 4/2007 |

OTHER PUBLICATIONS

Yelick, Kathy, Load Balancing Part 1: Dynamic Load-Balancing Berkeley University, Oct. 1, 2007.*

Goswami, Kumar K. et al., Prediction-Based Dynamic Load-Sharing Heuristics IEEE Transactions on Parallel and Distributed Systems, vol. 4, No. 6, Jun. 1993.*

Snavely, Allan et al., Symbiotic jobscheduling for simultaneous multithread processor Proceeding ASPLOS-IX Proceedings of the ninth international conference on Architectural support for programming languages and operating systems, 2000.*

Zho, Songnian et al., UTOPIA: A Load Sharing Facilit for Large Heterogenous Distributed Computer Systems University of Toronto, Computer System Research Institute, Apr. 1992.*

How to Design a Self-Balancing Multicore Processor, Part I Rebel Science News, Sep. 4, 2007.*

How to Design a Self-Balancing Multicore Processor, Part II Rebel Science News, Sep. 6, 2007.*

How to Design a Self-Balancing Multicore Processor, Part III Rebel Science News, Sep. 8, 2007.*

El-Mandy, Ahmed et al., An Efficient Load-Balancing Algorithm for Image Processing Applications on Multicore Processors ACM, IFMT'08, Nov. 24-25, 2008.*

Kakulavarapu, Kamala Prasad, Dynamic Load Balancing Issues in the EARTH Runtime System McGill University, Dec. 1999.*

* cited by examiner

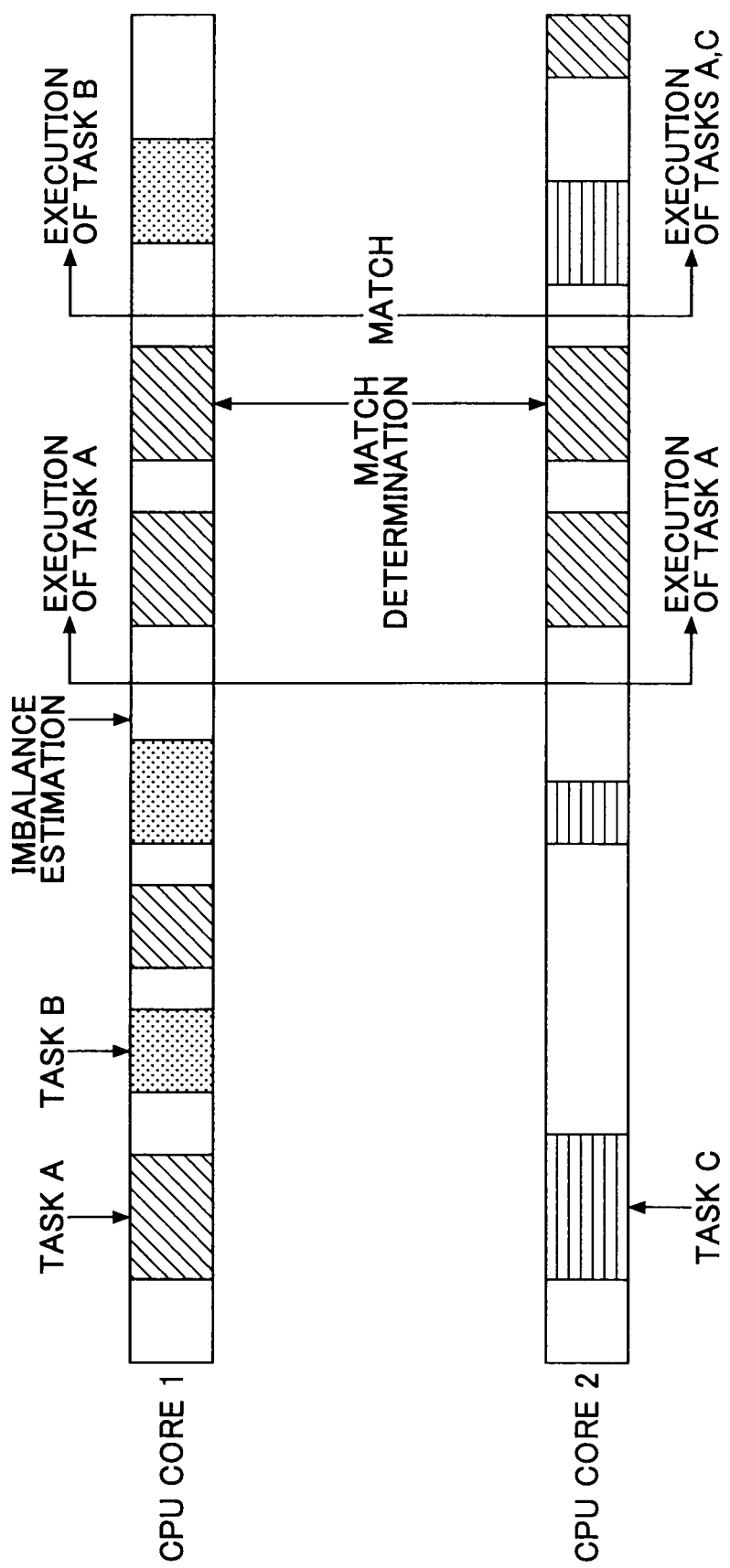

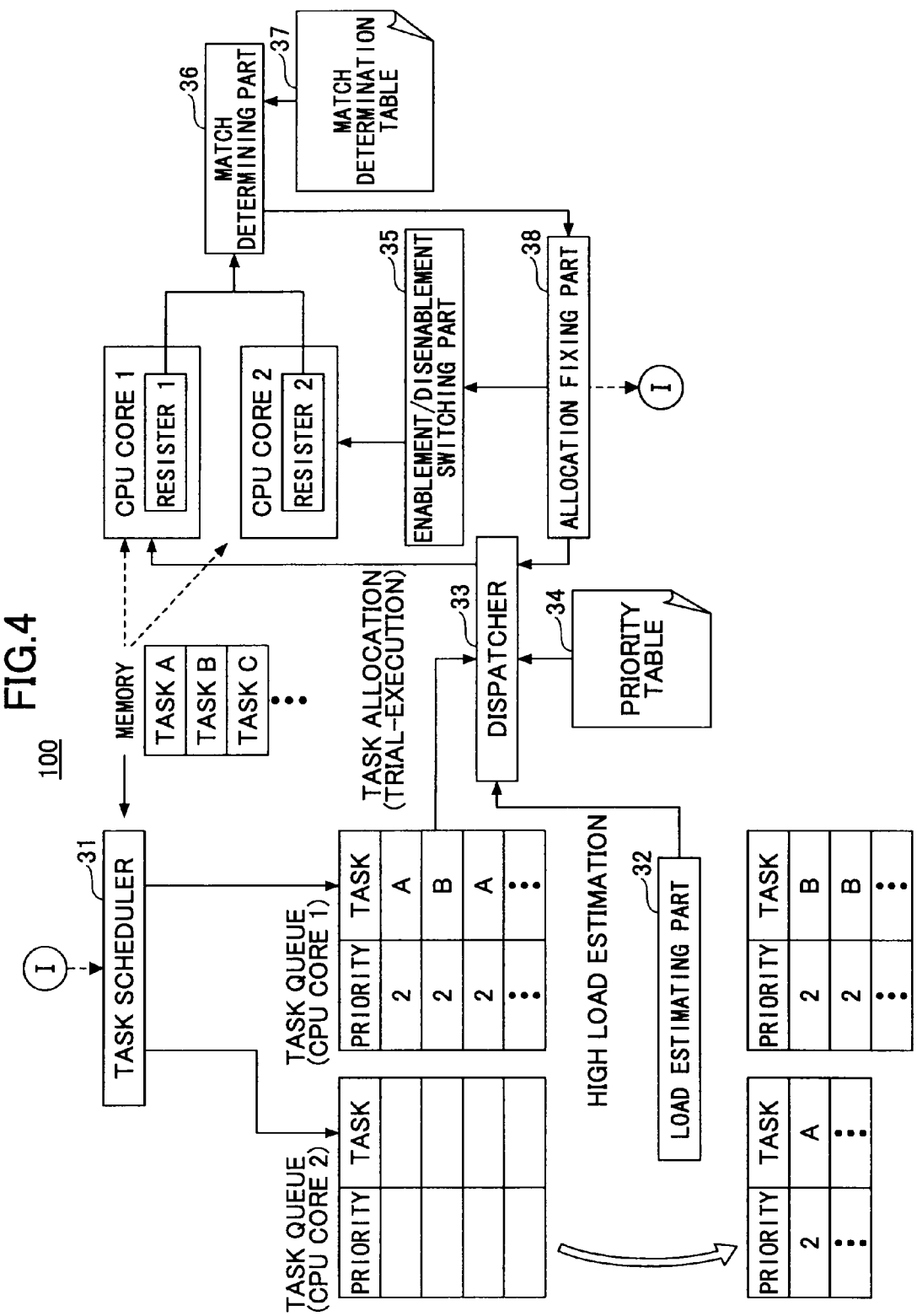

FIG.5A

| TASK | PRIORITY ORDER 1 | PRIORITY ORDER 2 | PRIORITY ORDER 3 |
|---|---|---|---|
| TASK A | CPU CORE 2 | CPU CORE 1 | CPU CORE 3 |
| TASK B | CPU CORE 1 | CPU CORE 2 | CPU CORE 3 |
| TASK C | CPU CORE 2 | CPU CORE 3 | CPU CORE 1 |

FIG.5B

| TASK | ALLOWABLE VALUE | MAXIMUM STANDBY TIME |
|---|---|---|
| TASK A | A% | Ta |
| TASK B | B% | Tb |
| TASK C | C% | Tc |

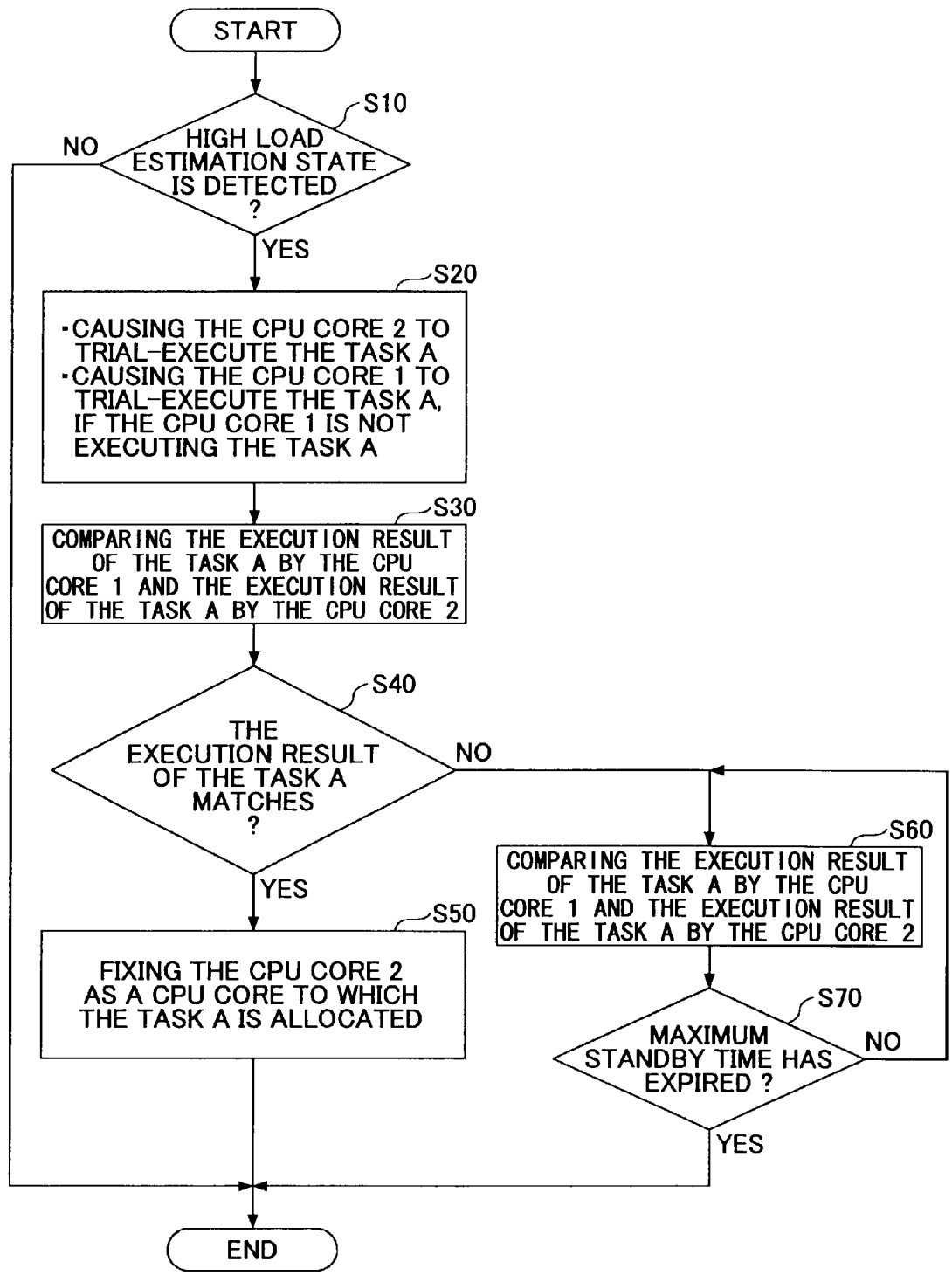

SYSTEM AND METHOD FOR TRANSFERRING TASKS IN A MULTI-CORE PROCESSOR BASED ON TRIAL EXECUTION AND CORE NODE

TECHNICAL FIELD

The present invention relates to a multi core system in which each of a plurality of CPU cores executes a processing for each task, a vehicular electronic control unit, and a task switching method.

BACKGROUND ART

In executing a program, a CPU executes the program while generating tasks (a task is an executable unit of CPU) from the program and scheduling the tasks. In the case of processing which requires assurance of an execution time, a scheduler can determine a priority of each task and a dispatcher can allocate each task to the CPU depending on the priority.

In a computer in which a plurality of CPU cores are mounted, the computer improves its processing efficiency by allocating a plurality of tasks to each CPU core while allowing temporal overlap (see Patent Document 1 for example). The Patent Document 1 describes a multi processor system configured to calculate degree of parallel processing capability for each task and allocate each task to each CPU core depending on the degree of parallel processing capability and length of processing time.

There is also a system configured to instruct a plurality of CPU cores to work on another OS so that each OS shares and executes tasks (see Patent Document 2 for example). The Patent Document 2 describes a multi processor system which controls processing loads among OSs by determining a load for each OS and instructing a CPU core working on an OS with a low processing load to work on an OS with a high processing load.

However, allocating tasks dynamically as in the CPU core described in Patent Document 2 may bring disadvantages. For example, in a series of processing of motor control, a task is often executed by applying an execution result of a previous task to a feedback control for a next task. For example, since it is difficult to rapidly increase a rotating speed of an electric motor, a task which determines an amount of current supplied to the electric motor based on the feedback control calculates the amount of current supplied to the electric motor so that it can obtain a target value depending on the previous amount of current.

In this way, sometimes a multi core system in a control system can not obtain a desired execution result if it can not utilize the execution result of the previous task. There is also a possibility that the system goes out of control due to sudden change in a controlled variable if it switches a CPU core to which a task is allocated simply depending on a processing load or it requests another CPU core to execute parallel processing.

In general, although a multi CPU core can transfer an execution result via a shared memory, IPC (Inter Process Communication), or the like, considering that contents in the shared memory may be destroyed or IPC may be delayed, relying only on such a structure is not enough.

Load distribution in such a multi core system is known in the prior art for a task of information-processing system. However, a data input corresponds one-to-one with a data output in the task of information-processing system and it is rare that an execution result of a previous task is required for a next task. Thus, it has not been proposed to allocate a task of information-processing system considering an execution result of a previous task so far.

[Patent Document 1] Japanese Patent Publication No. H10-143380
[Patent Document 2] Japanese Patent Publication No. 2007-188212

DISCLOSURE OF THE INVENTION

Problems to be Solved by the Invention

In view of the above-mentioned problems, it is an object of the present invention to provide a multi core system capable of switching CPU cores executing tasks without causing sudden change in control, a vehicular electronic control unit, and a task switching method.

Means for Solving Problems

To achieve the object above, an embodiment of the present invention is a multi core system for allocating a task generated from a control system program to an appropriate CPU core and executing the task. The multi core system has a trial-execution instructing part (for example a dispatcher 33) configured to cause a second CPU core 2 to trial-execute a task which a first CPU core 1 executes before the multi core system transfers the task from the first CPU core 1 to the second CPU core 2 and causes the second CPU core 2 to execute the task, a determining part configured to determine whether the execution result by the first CPU core 1 matches the execution result by the second CPU core 2, and an allocation fixing part configured to fix the second CPU core 2 as the appropriate CPU core to which the task is allocated if the determining part determines that the execution result by the first CPU core 1 matches the execution result by the second CPU core 2.

Effect of the Invention

It is possible to provide a multi core system capable of switching CPU cores which execute tasks without causing sudden change in control, a vehicular electronic control unit, and a task switching method.

BRIEF DESCRIPTION OF THE DRAWINGS

FIG. 1B is a diagram diagrammatically illustrating load distribution if there is an imbalance between a processing load of a CPU core 1 and a processing load of a CPU core 2.

FIG. 4 is an example of a functional block diagram of a multi core system.

FIG. 5A is a diagram showing an example of a priority table.

FIG. 5B is a diagram showing an example of a match determination table.

FIG. 6 is a flow chart showing an example of a procedure where a multi core system allocates tasks to CPU cores.

EXPLANATION OF REFERENCE SIGNS

11 AP (control system program)
12 OS
13 inter-OS communicating part
14 hardware resource (HW)
25 sensors
26 actuators
50 ECU (Electronic Control Unit)
100 multi core system

BEST MODE FOR CARRYING OUT THE INVENTION

With reference to the figures, the best mode for carrying out the present invention is described below with embodiments.
[First Embodiment]

Figure 1A:
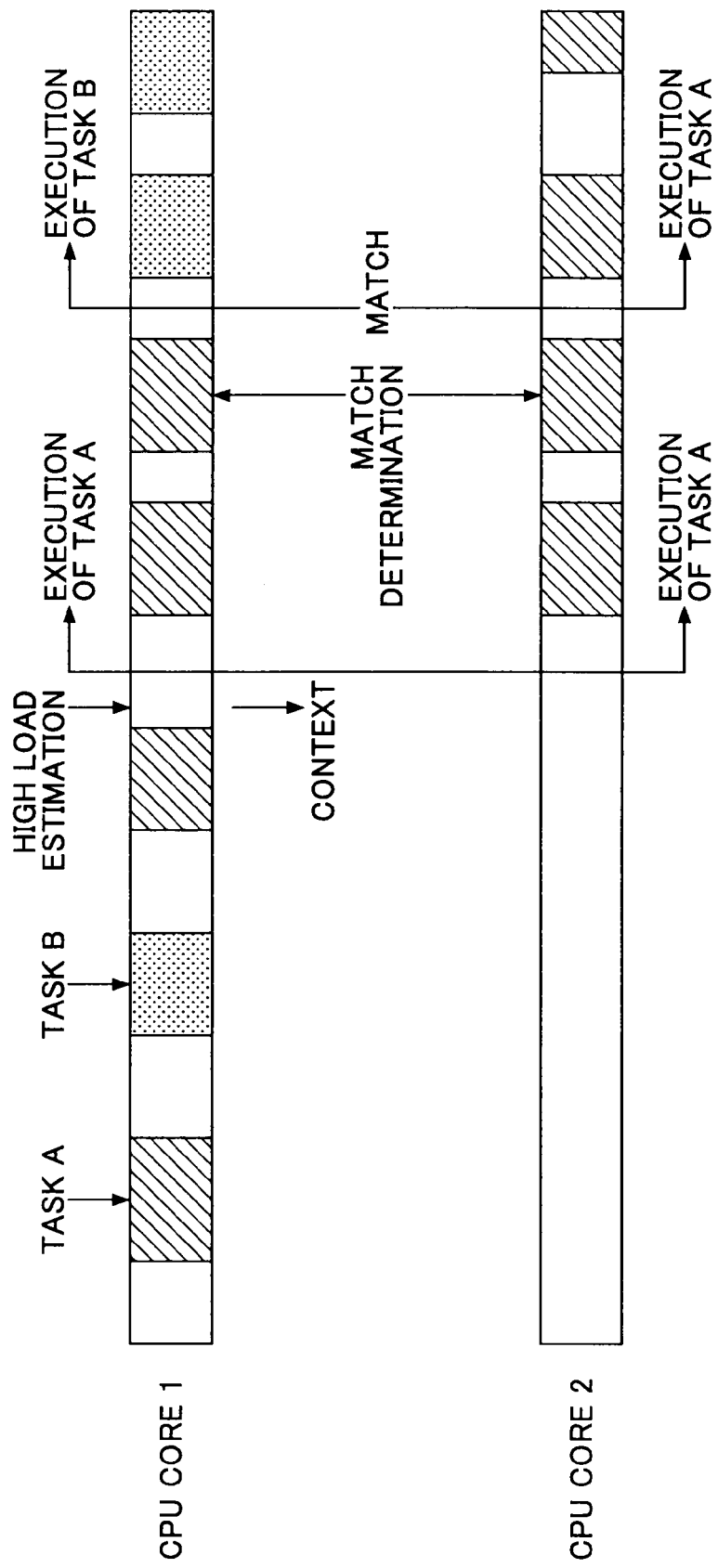
FIG. 1A is an example of a diagram diagrammatically illustrating load distribution by a multi core system.

FIG. 1A is an example of a diagram diagrammatically illustrating load distribution by a multi core system 100 according to an embodiment of the present invention. The multi core system 100 shown in FIG. 1A includes a CPU core 1 and a CPU core 2 (hereinafter called "a CPU core 1~*n*" unless distinguished), the CPU core 1 executes a task A and a task B according to a predetermined schedule. For example, if an OS (Operating System) detects that a processing load of the CPU core 1 has become high or detects that there is a possibility that the processing load of the CPU core 1 will become high, the CPU core 2 receives a context of a predetermined task (the task A in the figure) from the CPU core 1 (it is not always necessary to receive the context), and trial-executes the task A. The CPU core 1 executes the task A at the request of control (hereinafter, this may be called "actual demand execution"), or trial-executes the task A. That is, in either case, the CPU core 1 executes the task A.

Then, the OS determines whether an execution result of the task A by the CPU core 1 matches an execution result by the CPU core 2. If they match, the multi core system 100 switches the CPU core 1~*n* which is to execute the task A from the CPU core 1 to the CPU core 2.

After evaluating the execution results by the CPU core 1 and CPU core 2, by switching the CPU core 1~*n* which is to execute the task A, even in processing of a control system where a previous execution result affects a present execution result, the multi core system 100 can switch the CPU core 1~*n* which is to execute the task A without disrupting a control utilizing a computational result of the task A. After allocating the task A to the CPU core 2, the CPU core 1 executes the task B, and the CPU core 2 executes the task A. In this way, the multi core system 100 distributes processing loads.

FIG. 1B is a diagram diagrammatically showing load distribution in the case where there is an imbalance between a processing load of the CPU core 1 and a processing load of the CPU core 2. For example, if the OS detects or estimates the imbalance between the processing load of the CPU core 1 and the processing load of the CPU core 2 (hereinafter, this estimation may be called "imbalance estimation"), similar to FIG. 1A, the CPU core 2 receives a context of a predetermined task (the task A in the figure) from the CPU core 1 (it is not always necessary to receive the context), and both the CPU core 1 and the CPU core 2 execute the task A. The OS switches a CPU core 1~*n* which is to execute the task A to the CPU core 2 if execution results of the task A by both CPU cores match. Thus, after evaluating the execution results, the OS can distribute processing loads.

Figure 2:
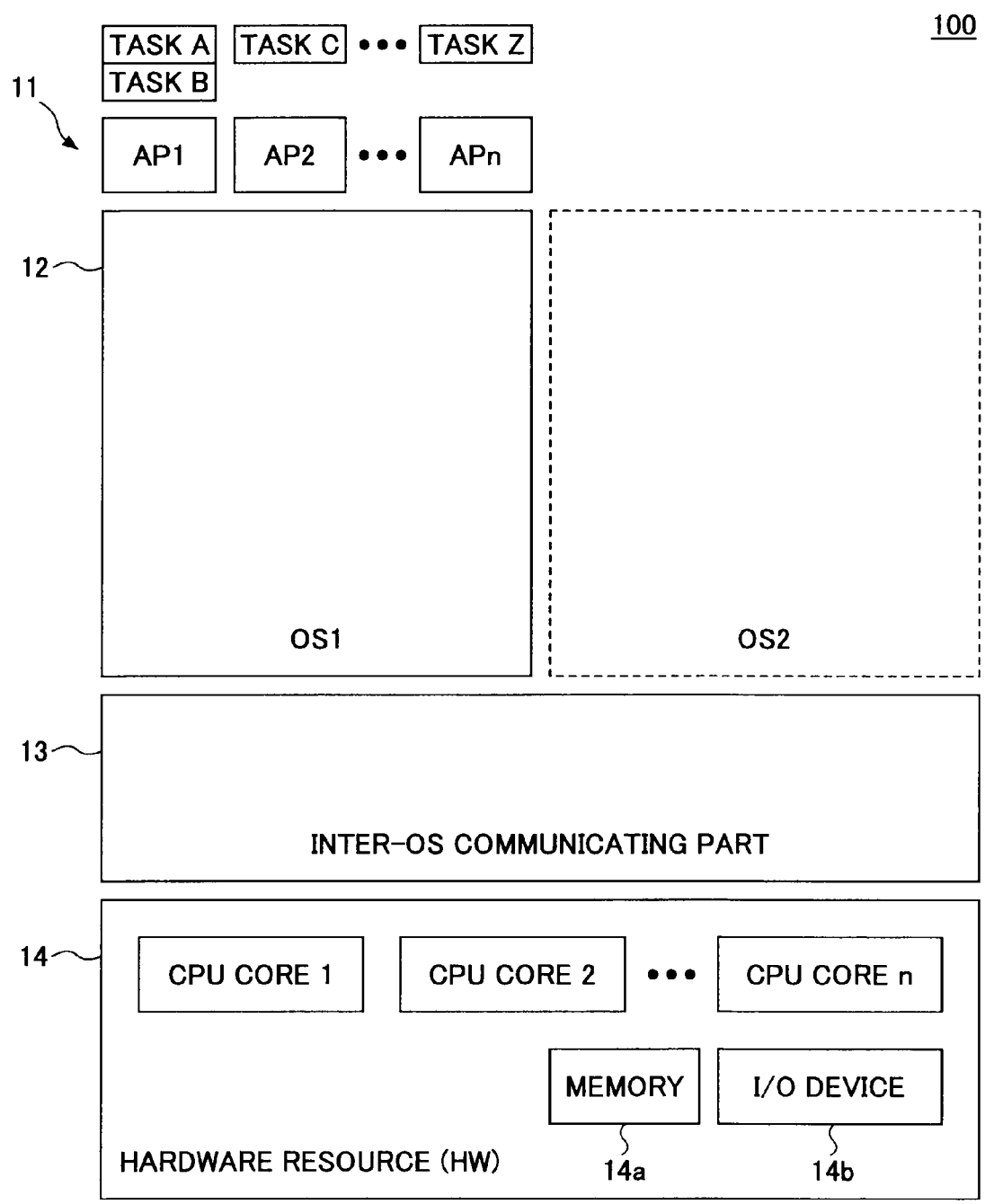
FIG. 2 is an example of a diagram diagrammatically showing a platform which a multi core system achieves.

FIG. 2 is an example of a diagram diagrammatically showing a platform which the multi core system 100 achieves. The multi core system 100 can instruct one or more OSs (OS1 and OS2 in the figure, hereinafter called "OS 12" unless distinguished) to work independently and in parallel on one hardware resource (hereinafter called "HW"). Applications AP1~APn (hereinafter simply called "AP 11" unless distinguished) are executable independently on OS1. For example, the applications are configured so that a processing of the AP1 does not affect the processing result of the AP2.

Each of AP 11 may be, for example, an engine control program, a camera control program which controls a capturing system configured to recognize a white line or a pedestrian, a navigation program, or the like. The multi core system 100 according to the present embodiment enables load distribution in executing AP 11 (tasks generated from AP 11) of a control system which controls hardware such as an engine or an actuator. The camera control program, although it is a program processing an image taken by a camera, is incorporated into the control system program, since the camera control program may sometimes control, for example, a steering angle of an electric power steering based on its processing result (for example, information about a white line such as a width, a curvature, or the like can be obtained). Not only the camera which captures outside of a vehicle as described but also a camera control program which detects inattentive driving or a degree of sleepiness of a driver can be incorporated into the control system program, since detections of the inattentive driving or the degree of sleepiness are utilized for controlling a buzzer. Similarly, the navigation program can also be incorporated into the control system program, since the navigation program engages a vehicle control such as shift down or deceleration when a vehicle reaches a position in front of an intersection or a bend. A program which controls a vehicle body system for controlling lights, lock/unlock, windshield wipers, or the like, may also be incorporated into the control system program.

AP 11 suitable for the multi core system 100 is discernible based on not only whether it is with or without a controlled object but also a processing manner. If a task in AP 11 is a task which controls hardware whose physical condition such as an amount of current supplied to an electric motor or a rotating speed of an engine changes continuously, the CPU core 1~*n* executes the task by using the previous execution result of the same task. Thus, AP 11 of the control system can be defined as a program in which the CPU core 1~*n* executes the same task by using the previous execution result, or a program in which the previous execution result affects a next execution result. Such a control is widely utilized in feedback control.

In the present embodiment, it will be assumed that the multi core system 100 executes OS1 by the CPU core 1 and CPU core 2, and also executes tasks A~C in AP 11 by the CPU core 1 and CPU core 2. Each of the tasks A-C may or may not correspond one-to-one with each of AP1~APn. In the figure, AP 11 is executed on OS1. However, part or all of AP 11 can be executed on OS2 if the multi core system 100 is a multi OS platform.

HW 14 includes a memory 14a (a RAM 21, a cache memory of a CPU core, storage device 22), an I/O device 14b (for example, an interface with an actuator, a switch element, a touch panel, a display, or the like), or other hardware as well as the CPU core 1~n. HW 14 is provided with at least two or more CPU cores (a multi core type) or a plurality of CPUs (a multi CPU type). The CPU core 1 and the CPU core 2 may be homogeneous, each having the same architecture, or may be heterogeneous, each having a different architecture.

An inter-OS communicating part 13 is resident software which a user (for example a driver) does not have to be aware of, and allocates HW 14 to OS1 and OS2 by dividing HW 14 logically (and temporarily). Thus, there is no need for the inter-OS communicating part 13 in the multi core system 100 in the case where the multi core system 100 is not using a multi OS system. Functions of OSs described below can be provided by either of OS1 or the inter-OS communicating part 13, or provided by OS1 in the absence of the inter-OS communicating part 13.

The inter-OS communicating part 13 constructs a plurality of virtual execution environments for a calculator by means of this logical division, and instructs OS1 to work on the execution environment. HW 14 is concealed from OS1 by the inter-OS communicating part 13. The inter-OS communicating part 13 monitors load status of OS1. If, for example, load on OS1 becomes high, the inter-OS communicating part 13 additionally allocates OS2 to a CPU core 3 to generate an execution environment. After execution, the inter-OS communicating part 13 provides inter-OS communication means by which OS1 and OS2 can communicate information. OS1 can request various services of the inter-OS communicating part 13 by issuing a system call, and OS1 and the inter-OS communicating part 13 can communicate with each other.

[Application to a Vehicular Electronic Control Unit]

Control systems mounted on a vehicle are getting more and more various, and needs for load adjustment among CPUs are getting higher. Therefore, the multi core system 100 of the present embodiment can be mounted on a vehicular electronic control unit as an example of an application thereof.

Figure 3:
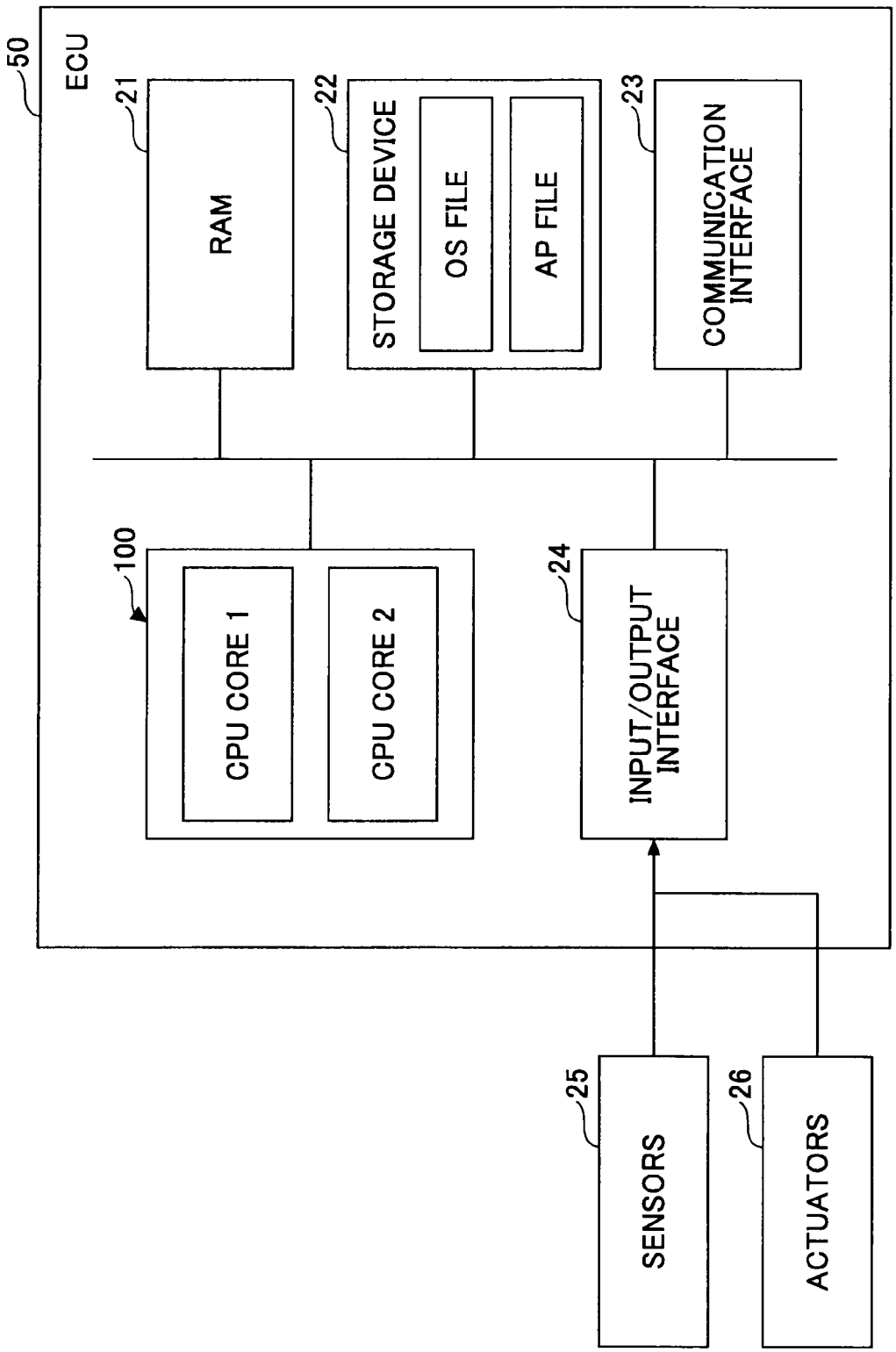
FIG. 3 is an example of a schematic diagram of an ECU (Electronic Control Unit) which includes a multi core system.

FIG. 3 shows an example of a schematic diagram of an ECU (Electronic Control Unit) 50 which includes the multi core system 100. An ECU 50 may be, for example, an engine ECU for controlling an engine, a motor ECU for controlling an electric motor generator of a hybrid vehicle, a hybrid ECU for issuing a torque command necessary for the engine and the electric motor, or the like. As described above, the multi core system 100 can be applied to a navigation ECU or the like.

In the ECU 50, the multi core system 100, the RAM 21, the storage device 22, a communication interface 23, and an input/output interface 24 are connected via an internal bus. The communication interface 23 is connected to an in-car LAN such as, for example, a CAN (Controller Area Network), a LIN (Local Interconnect Network), a FlexRay, or the like, and sends communication data to or receives communication data from another ECU. For example, the communication interface 23 is connected to a navigation ECU for controlling a navigation system, a brake ECU, or the like, and enables cooperative control with each ECU.

The input/output interface 24 is connected to sensors 25 and actuators 26. In the case where the ECU 50 controls the engine, the sensors 25 may be a variety of sensors such as, for example, an air flow sensor, a crank position sensor, an $O_2$ sensor, or the like, the actuators 26 may be a variety of actuators such as a throttle valve, a fuel injection valve, or the like. In the case where the ECU 50 is the motor ECU, the sensors 25 may be, for example, a current sensor for detecting a current value of a phase current, a resolver for detecting a rotational angle of a rotor of an electric motor, or the like, and the actuators 26 may be, for example, an electric motor generator.

The storage device 22 may be a hard disk drive, a flash memory, or the like, and stores an OS file for storing programs or data relating to an OS and an AP file for storing programs or data relating to AP 11. For example, when the ECU 50 is electrified in response to an ignition ON, the CPU core 1 executes the OS file. After initiating the inter-OS communicating part 13, the CPU core 1 initiates the OS1 and predetermined AP 11.

[Functional Block Diagram of the Multi Core System 100]

With reference to FIG. 4, a functional block of the multi core system 100 is explained. Each block in FIG. 4 is provided by OS1 or by the inter-OS communicating part 13. A priority table 34 and match determination table 37 described below can be stored in the memory 14a of HW 14 beforehand, or can be copied from the storage device 22 to the memory 14a at the time of startup of the multi core system 100.

OS1 executes AP 11 while dividing AP 11 into tasks (a task is a processable unit) and scheduling the tasks. The task is a minimum unit which OS1 can handle. The task is an object code of AP 11. The task is controlled by a TCB (Task Control Block). The TCB registers a task status (an executable state, an execution state, a standby state), identification information of task, a task pointer, an attribution (relocatable, reusable, reenterable, or the like), link information to a previous task, link information to a next task, a task owner (identification information of AP 11), a context (a status of a CPU core such as a content of a register), or the like. The context may include a last execution result of a task.

[Task Scheduling]

A task scheduler 31 selects next tasks to be allocated to the CPU core 1 and the CPU core 2 out of tasks in the memory 14a based on priorities and statuses of the tasks. The task scheduler 31 assigns a priority to the task A and the task B, and registers the task A and the task B into a task queue. If a high priority interrupt arises, such as software interrupt, hardware interrupt, system call, or the like, the task scheduler 31 forcibly switches tasks (preemption). In this way, the priorities of the task A or the task B are determined relatively depending on priorities of interrupts or the like. It will be assumed that in the figure a priority becomes higher with decreasing its value.

The task queue is sorted for each time slice so that a task with highest priority moves to the front of the queue. If priorities of tasks are equal, tasks are executed in sequence according to FIFO prioritization.

If a dispatcher 33 detects completion of each task or an interrupt by another task, the dispatcher 33 stores a context of the task presently being executed to the memory 14a, and causes the CPU core 1 to execute a next task. For example, the multi core system 100 references the task queue, allocates a task with the highest priority to the CPU core 1, and returns the stored context of the task to the CPU core 1. The multi core system 100 executes a plurality of tasks on the CPU core 1 by repeating this processing.

The task queue is often provided for each CPU core in a multi core system having a plurality of CPU cores. Essentially, the same task is registered into the task queue of the same CPU core. Thus, when context-switching from a task which utilizes the previous execution result as in feedback control to another task, the multi core system 100 reduces a context to be saved and restricts an overhead. Even if the multi core system 100 fails to save some contexts, the multi core system 100 can also maintain a continuity of execution results as long as the same CPU core executes the same task.

There are several ways to allocate a task to a CPU core. For example, if the multi core system 100 distributes processing loads of the CPU core 1 and the CPU core 2 evenly, the multi core system 100 allocates the task A, the task B, or the like to each task queue so that the number of tasks become equal. In the meantime, it may be preferable to reduce power consumption by causing only CPU core 1 to execute all tasks as much as possible and by leaving the CPU core 2 stopped. In such a case, the multi core system 100 initially registers as many tasks as possible into the task queue of the CPU core 1. Then the multi core system 100 registers tasks into the task queue of the CPU core 2 if the processing load of the CPU core 1 becomes high. Once a plurality of CPU cores has been initiated, the multi core system 100 can equalize processing loads among CPU cores by equally allocating tasks. From this point of view, as shown in the figure, the multi core system 100 of the present embodiment initially (at the time of startup of the ECU 50) attempts to reduce power consumption by allocating tasks to the CPU core 1 only, and equalizes processing loads after the CPU core 2 has been initiated.

[High Load Estimation, Imbalance Estimation]

A load estimating part 32 detects whether the processing load of the CPU core 1 is high or whether there is a possibility that the processing load of the CPU core 1 may become high in the situation that the CPU core 2 has not been initiated (high load estimation). The load estimating part 32 detects whether the difference between the processing load of the CPU core 1 and that of the CPU core 2 has become greater than or equal to a predetermined value or whether there is a possibility that the difference will become greater than or equal to the predetermined value after the CPU core 2 has been initiated (imbalance estimation).

[Situation where the CPU Core 2 has not been Initiated]

A high processing load is detected based on at least one of a usage rate of CPU core $R_1$, the number of tasks registered in the task queue $N_1$, and a status of a controlled object. The usage rate $R_1$ is a rate of a time period T within which the CPU core 1 executes a task relative to a predetermined time period $T_0$ (for example, a range between several seconds and several tens of seconds). Thus, the usage rate $R_1$ will be expressed in the following equation: $R_1=T/T_0$. A static state where only the CPU core 1 has been initiated is called an idle state. Since a processing load in the idle state is sufficiently low, if the usage rate $R_1$ is greater than a threshold value $R_0$, the multi core system 100 can detect a high processing load due to an execution of a task. According to the same idea, if the number of tasks in the task queue $N_1$ is greater than a predetermined value $N_0$, the multi core system 100 can detect the high processing load of the CPU core 1. Alternatively, if a car occupant has initiated AP 11, the multi core system 100 may detect the high processing load from this initiating operation.

Alternatively, the multi core system 100 can detect the high processing load from a status of a controlled object. In general, when controlling a controlled object whose status rapidly changes, a processing load becomes higher than a processing load in controlling the same controlled object whose change in status is slow. For example, since a time interval in a rotating speed control or in an ignition control decrease with increase in a rotating speed of an engine, a processing load increases with increase in the rotating speed. The same goes for an electric motor torque control. Thus, if a crank position detected from the sensors 25 or an angular velocity of rotating rotor becomes greater than or equal to respective threshold values, the multi core system 100 can detect the high processing load. In this case, the multi core system 100 may detect the high processing load by recognizing that a vehicle speed is greater than or equal to a threshold value. This is because the vehicle speed also becomes high in such a case.

The load estimating part 32 detects whether there is a high processing load based on any one of or a combination of two or more of the following conditions. $T_{R1\sim2}$, $T_{N1\sim2}$, $Td_{R1\sim2}$, $Td_{N1\sim2}$, $T_{N1\sim2}$, $T_{R12}$, $Td_{R12}$, $Td_{R12}$, $Td_{N12}$, and $T_s$ represent a threshold value.

The usage rate $R_1$ ($=T/T_0$)$>T_{R1}$.
The number of tasks $N_1 > T_{N1}$
The vehicle status value $S > T_s$ The possibility that the processing load will become high can be detected from a rate of temporal change $dR_1$ in the usage rate $R_1$, a rate of temporal change $dN_1$ in the number of tasks $N_1$, a rate of temporal change dS in the vehicle status value S. The load estimating part 32 monitors each of the usage rate $R_1$, the number of tasks $N_1$, and the vehicle status value S in chronological order. If a status where any of the rate of temporal change dR1, dN1, dS is greater than the corresponding threshold value has lasted longer than a predetermined time period P, the load estimating part 32 detects that there is a possibility that the processing load will increase. In this way, the load estimating part 32 detects that there is a possibility that the processing load will increase based on any one of or a combination of two or more of the following condition.

The load estimating part 32 can also detect the possibility of the high processing load based on any one of or a combination of two or more of the usage rate $R_1$, the number of tasks $N_1$, and the vehicle status value S.

The increasing rate $dR_1 > T_{dR1}$
The increasing rate $dN_1 > T_{dN1}$
The increasing rate $dS > T_{dS}$

[After the CPU Core 2 has been Initiated]

After the CPU core 2 has been initiated, the usage rate R2 of the CPU core 2, the number of tasks N2, and the vehicle status value S are calculated as in the case with the CPU core 1. The load estimating part 32 detects whether there is an imbalance between the processing load of the CPU core 1 and the processing load of the CPU core 2, or whether there is a possibility that there is an imbalance.

The load estimating part 32 detects the imbalance between the processing load of the CPU core 1 and the processing load of the CPU core 2, based on any one of or a combination of the following conditions.

$R_1-R_2>T_{R12}$
$N_1-N_2>T_{N12}$

In such cases where the processing load of the CPU core 1 is higher, the multi core system 100 allocates tasks to CPU core 2.

$R_2-R_1>T_{R12}$
$N_2-N_1>T_{N12}$

In such cases where the processing load of the CPU core 2 is higher, the multi core system 100 allocates tasks to CPU core 1. In this way, the multi core system 100 can equalize the processing loads. The load estimating part 32 does not utilize the vehicle status value S for the imbalance estimation, since the vehicle status value S is common to the CPU core 1 and the CPU core 2 and not suitable for the detection of the imbalance.

Similarly, the load estimating part 32 detects whether there is a possibility that an imbalance between the processing load of the CPU core 1 and the processing load of the CPU core 2 may arise, based on any one of or a combination of the following conditions.

$dR_1-dR_2>T_{dR12}$
$dN_1-dN_2>T_{dN12}$

In this way, the load estimating part 32 detects the high load estimation state and the imbalance estimation state.

If the processing load of the CPU core 1 or 2 has become low (in the case where at least one of conditions, where the usage rate $R_1$ is less than or equal to a threshold value which is less than $TR_1$ and where the number of tasks $N_1$ is less than or equal to a threshold value which is less than $TN_1$, is met), the multi core system 100 can disenable the CPU core 1 or the CPU core 2 whose processing load has become low. Thus, the multi core system 100 can reduce power consumption by disenabling a part of the CPU core 1~$n$. In such a case, a task which the disenabled CPU core 1~$n$ has been executing is allocated to another CPU core 1~$n$. However, as previously explained, the multi core system 100 prevents an abrupt change in control by allocating after determining whether the execution results match.

[Trial-Execution of a Task]

A method in which the dispatcher 33 determines the task A as a task to be trial-executed by the CPU core 2 with a low processing load is explained. As shown in FIG. 1A, when the CPU core 1~$n$ executes a task in the multi core system 100 of the present embodiment, they may execute the task in response to the needs from control (on an actual demand), or they may execute the task on trial. In either case, the dispatcher 33 allocates the task to the CPU core 1~$n$. Some executions change from executions on trial to execution on an actual demand. Consequently, although the distinction between "allocation" and "trial-execution" is not clear, the allocation of a task by the dispatcher 33 may sometimes be expressed as "trial-execution" by the CPU core 1~$n$. This is because one of features of the present embodiment is that the CPU core 1~$n$ trial-executes.

There are a static determination method and a dynamic determination method in determining the task A as a task to be trial-executed by the CPU core 2. The static determination method predetermines the CPU core 1~$n$ for preferentially executing each task.

FIG. 5A is a diagram showing an example of a priority table 34. The priority table 34 registers the CPU cores for preferentially executing each task with their priority orders. As shown in FIG. 1A, the CPU core 1 executes the task A before the CPU core 2 is initiated. However, according to the priority table 34, the CPU core 2 is supposed to preferentially execute the task A. Thus, once the CPU core 2 has been initiated, the dispatcher 33 can determine to cause the CPU core 2 to trial-execute the task A.

According to the priority table 34, the dispatcher 33 can determine the CPU core 2 as a CPU core for trial-executing the task A even after the CPU core 2 has been initiated. For example, if the imbalance estimation state of the processing load in the state of FIG. 1B is detected, the dispatcher 33 can determine to cause the CPU core 2 to trial-execute the task A. This is because the task A which the CPU core 1 with a high processing load has been executing should be preferentially executed by the CPU core 2 according to the priority table 34.

Then, if the processing load of the CPU core 2 becomes high, the dispatcher 33 transfers the task A or the task C to another CPU core. However, according to the priority table 34, both the task A and the task C have already been allocated to the CPU core 2 with the highest priority order. Thus, by referring to the priority table 34, the dispatcher 33 causes the CPU core 1 with the second highest priority order to trial-execute the task A. The multi core system 100 can initiate the CPU core 3 if the processing load of the CPU core 1 is also high.

Thus, if the priority table 34 is adjusted appropriately, the dispatcher 33 can determine a CPU core for trial-executing a task according to a priority order, and equalize processing loads.

On the other hand, in the dynamic determination method, the dispatcher 33 determines a CPU core for trial-executing a task depending on the state of the CPU core 1 (or the CPU core 2) in the high load estimation state or the imbalance estimation state. For example, if the CPU core 1 is executing the task A, the dispatcher 33 can reduce an overhead associated with context switching and an error associated with saving or restoring by causing the CPU core 1 to keep executing the task A and by causing the CPU core 2 to execute the task B. In such a case where the CPU core 1 can furnish the execution result of the task A via the I/O device 14$b$ to the actuators 26, the CPU core 1 can trial-execute while continuing its control.

If there is a plurality of tasks, other than the task B, unexecuted by the CPU core 1 (if there are the task B and the task C), it is necessary to determine which the CPU core 2 is to trial-execute. In this case, the dispatcher 33 refers to a priority of each task registered in the task queue, and causes the CPU core 2 to trial-execute a task with the lowest priority or a task at the end of the task queue. In this way, the multi core system 100 makes time to perform a match determination process to be described below.

[Handling of the Execution Result Associated with Trial-Execution]

The execution result (a numerical value) of the CPU core 1 or the CPU core 2 in a register 1 or 2 of the CPU core 1 or 2 is stored in a respective data buffers, and then sent to the RAM 21, the communication interface 23, or the input/output interface 24 via bus arbitration. However, the execution result of the task A trial-executed by the CPU core 2 is in the state that a verification of the execution result is still insufficient. In addition, the execution of the task A by the CPU core 1 is not always based on an actual demand of needs from the vehicle control. Even if the execution result of the CPU core 2 is correct and the execution by the CPU core 1 is based on the actual demand, it is not necessary to have the same overlapping results.

That is, the trial-execution of the task A creates the possibility that an unnecessary execution result is outputted to the input/output interface 24 or the like. Thus, if the dispatcher 33 causes the CPU core 2 to trial-execute the task A, an enablement/disenablement switching part 35 prohibits the CPU core 2 from outputting the execution result to the input/output interface 24 or the like. If the dispatcher 33 causes the CPU core 1 to trial-execute the task A which is not based on an actual demand, the enablement/disenablement switching part 35 prohibits the CPU core 1 from outputting the execution result to the input/output interface 24 or the like. In this way, only the execution result based on the actual demand is outputted to the input/output interface 24. Specifically, for example, the enablement/disenablement switching part 35 prohibits the execution results in the registers of the CPU core 1 or the CPU core 2 from being stored in the data buffers, or deletes the execution results stored in the data buffers.

[Match Determination of the Execution Results]

If the load estimating part 32 detects the high load estimation state or the imbalance estimation state, as described above, the dispatcher 33 determines the task A as a task to be trial-executed by the CPU core 2 in the static or the dynamic method. As in the case of interrupt handling, the dispatcher 33 restores the context of the CPU core 1 to the CPU core 2. It is not always necessary to transfer the context (the execution result) from the CPU core 1 to the CPU core 2. This is because the present embodiment determines whether there is a match in the execution results. However, it can be expected that restoring the context can reduce time to the match in the execution results of the CPU core 1 and the CPU core 2.

Then, match determining part 36 compares the execution result of the task A by the CPU core 1 and the execution result of the task A by the CPU core 2, and determines whether they match. Each of the execution results is stored in the register of the CPU core 1 or the CPU core 2. The match determining part 36 applies exclusive logical add operation (XOR) between contents of two registers, and determines that there is a match if all bits are "0".

If there is a match, an allocation fixing part 38 fixes the CPU core 2 as a CPU core to which the task A is allocated. The allocation fixing part 38 informs the enablement/disenablement switching part 35, the dispatcher 33, and the task scheduler 31 that the CPU core 2 is fixed. As a result, the enablement/disenablement switching part 35 permits the CPU core 2 to output the execution result. The dispatcher 33 forcibly terminates the task A which the CPU core 1 has been executing. The task scheduler 31 deletes the task A from the task queue of the CPU core 1 and registers the task A, which was deleted, into the task queue of the CPU core 2.

In the match determination process, there are some cases where execution results may not match but the difference in the comparison of the execution results is insignificant. In the case of controlling an engine or an electric motor, it is preferable to allow slight difference with respect to a target controlled variable in some cases. Such an allowable value may differ from task to task.

Thus, the multi core system 100 registers an allowable difference value of an execution result for each task into the match determination table 37 beforehand. FIG. 5B shows an example of the match determination table 37. The match determining part 36 refers to the match determination table 37 for each task, and if the difference is within the allowable range, the match determining part 36 determines that there is a match. In the following sentences, the case where the difference is within the allowable range is included in a "match".

If there is no match, the multi core system 100 can not attempt to equalize processing loads among CPU cores as far as the task A is not allocated to another CPU core. This leads to a possibility that the execution result may be delayed. Thus, if there is no match in the comparison result, the match determining part 36 waits until there is a match. In this way, the multi core system 100 can facilitate the equalization of the processing loads.

The match determination table 37 in FIG. 5B registers the maximum standby time for each task. This is because a long period of waiting results in a delay in computation for the actual demand. If there is no match in the comparison result, the match determining part 36 causes the CPU cores to execute the task repeatedly until the maximum standby time expires in waiting until there is a match. If there is no match within the maximum standby time, the dispatcher 33 causes the CPU core 2 to trial-execute a next task (the task B for example), and the match determining part 36 again determines whether the execution result of the task B by the CPU core 1 matches the execution result of the task B by the CPU core 2. In this way, the multi core system 100 can allocate a task whose execution result is easier to match, to the CPU core 2. If a task with higher priority is registered in the task queue, even within the maximum standby time, the dispatcher 33 forcibly terminates a task for a match determination process.

[Procedures of the Multi Core System 100]
[Before the Initiation of the CPU Core 2]

Based on the constitution above, with reference to a flow chart in FIG. 6, a procedure in which the multi core system 100 transfers the task A to the CPU core 2 is described. The procedure in FIG. 6 is repeatedly executed for each predetermined cycle time while the multi core system 100 is running. At the time of startup of the multi core system 100, the CPU core 2 is not initiated, while the CPU core 1 executes all tasks. The load estimating part 32 constantly monitors the processing load of the CPU core 1.

For each cycle time, the load estimating part 32 determines whether a processing load has become high or whether there is a possibility that a processing load may become high (S10). If the high load estimation state is not detected (NO in S10), the procedure in FIG. 6 terminates directly.

If the high load estimation state is detected (YES in S10), the load estimating part 32 requests the dispatcher 33 to trial-execute a task. The dispatcher 33 determines the task A as a task to be allocated according to either the static or the dynamic method, and causes the CPU core 2 to trial-execute the task. If the CPU core 1 is not executing the task A, the dispatcher 33 causes the CPU core 1 to trial-execute the task A (S20).

If the CPU core 2 has already been initiated, the multi core system 100 makes sure that the processing load of the CPU core 2 is sufficiently low. When the multi core system 100 causes the CPU core 2 to trial-execute the task A, the enablement/disenablement switching part 35 prohibits the CPU core 2 from outputting the execution result. Similarly, if the execution of the task A by the CPU core 1 is not based on the actual demand, the enablement/disenablement switching part 35 prohibits the CPU core 1 from outputting the execution result.

Then, the match determining part 36 compares the execution result of the task A by the CPU core 1 and the execution result of the task A by the CPU core 2 (S30). The match determining part 36 refers to the match determination table 37 and determines whether there is a match, depending on whether the difference is within the allowable range (S40).

If there is a match in the execution results of the task A by the CPU core 1 and by the CPU core 2 (YES in S40), the allocation fixing part 38 fixes the CPU core 2 as a CPU core to which the task A is allocated (S50). In this way, the dispatcher 33 stops the allocation of the task A to the CPU core 1, the enablement/disenablement switching part 35 permits the CPU core 2 to output the execution result, and the task scheduler 31 deletes the task A from the task queue of the CPU core 1 and registers the task A, which was deleted, into the task queue of the CPU core 2.

As described above, the multi core system 100 can reduce power consumption while the processing load is low. If the processing load has become high, the multi core system 100 can assure the execution time by equalizing processing loads of two CPU core.

As far as there is no match in the execution results of the task A by the CPU core 1 and by the CPU core 2 (NO in S40), the match determining part 36 continues to compare the execution results of the repeatedly executed task A until the maximum standby time of the task A stored in the match determination table 37 expires (S60, S70). If there is a feedback control, the multi core system 100 can facilitate the equalization of the processing load by waiting. This is because it can be expected that the two execution results approach owing to the repeated execution.

[After the Initiation of the CPU Core 2]

Figure 7:
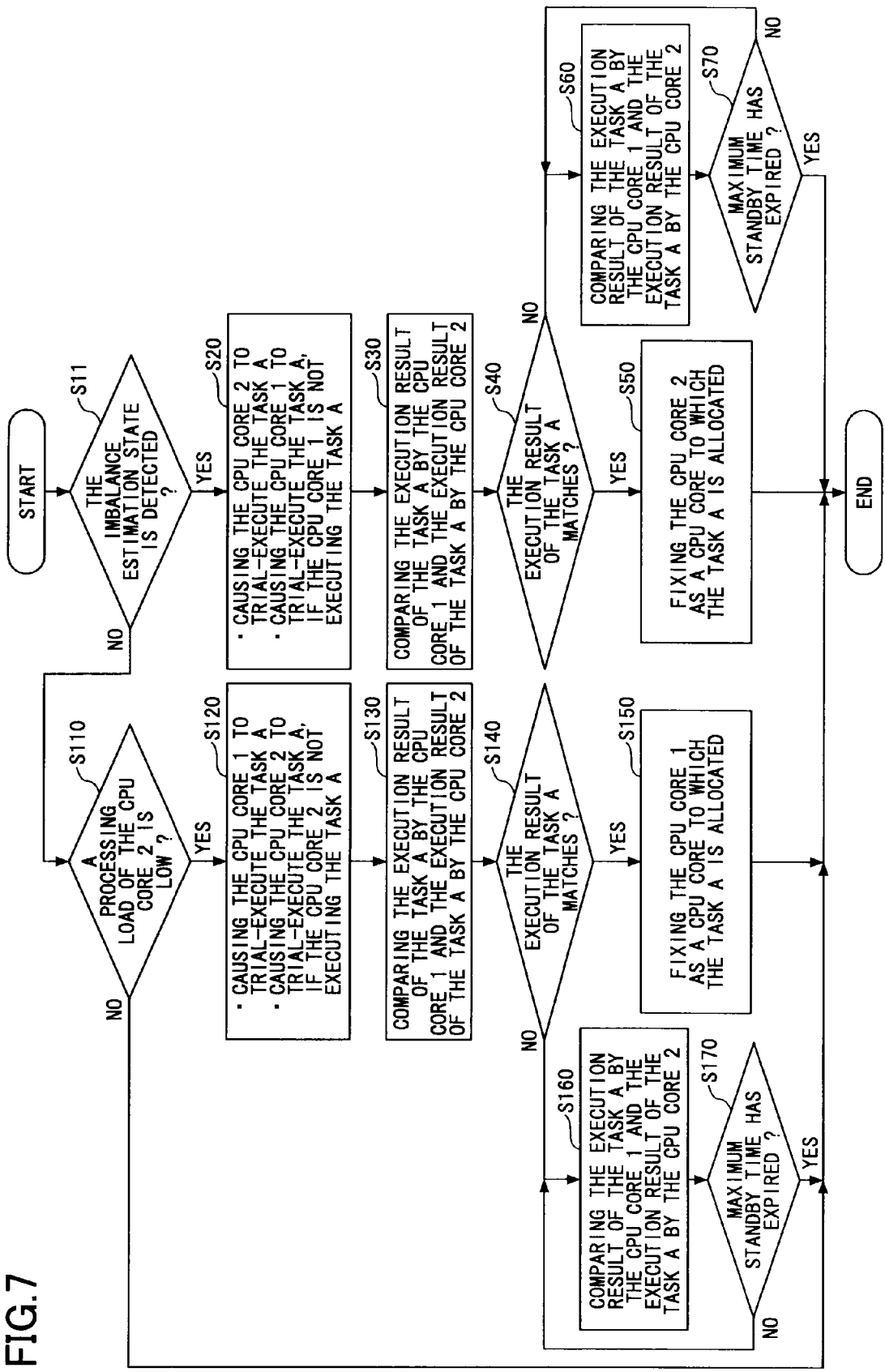
FIG. 7 is a flow chart showing an example of a procedure for equalizing processing loads and causing a CPU core to stop.

Next, with reference to FIG. 7, a procedure in the case where while both the CPU core 1 and the CPU core 2 execute a task, an imbalance between processing loads has arisen or there is a possibility that the imbalance arises is described.

For each cycle time, the load estimating part 32 determines whether an imbalance between processing loads has arisen or whether there is a possibility that an imbalance will arise (S11).

If the load estimating part 32 detects the imbalance estimation state (YES in S11), the load estimating part 32 requests the dispatcher 33 to trial-execute a task. The dispatcher 33 determines the task A as a task to be allocated according to either the static or the dynamic method, and causes the CPU core 2 to trial-execute the task. If the CPU core 1 is not executing the task A, the dispatcher 33 causes the CPU core 1 to trial-execute the task A (S20). When the multi core system 100 causes the CPU core 2 to trial-execute the task A, the enablement/disenablement switching part 35 prohibits the CPU core 2 from outputting the execution result. Similarly, if the execution of the task A by the CPU core 1 is not based on the actual demand, the enablement/disenablement switching part 35 prohibits the CPU core 1 from outputting the execution result.

Then, the match determining part 36 compares the execution result of the task A by the CPU core 1 and the execution result of the task A by the CPU core 2 (S30). The match determining part 36 refers to the match determination table 37 and determines whether there is a match, depending on whether the difference is within the allowable range (S40).

If there is a match in the execution results of the task A by the CPU core 1 and by the CPU core 2 (YES in S40), the allocation fixing part 38 fixes the CPU core 2 as a CPU core to which the task A is allocated (S50). In this way, the dispatcher 33 stops the allocation of the task A to the CPU core 1, the enablement/disenablement switching part 35 permits the CPU core 2 to output the execution result, and the task scheduler 31 deletes the task A from the task queue of the CPU core 1 and registers the task A, which was deleted, into the task queue of the CPU core 2. In this way, if an imbalance between the processing loads of the two CPU cores 1, 2 arises, the multi core system 100 can equalize the processing loads.

If there is no match in the execution results of the task A by the CPU core 1 and by the CPU core 2 (NO in S40), the match determining part 36 continues to compare the execution results of the repeatedly executed task A until the maximum standby time of the task A stored in the match determination table 37 expires (S60, S70). In this way, the multi core system 100 can equalize the processing loads as much as possible.

Figure 8:
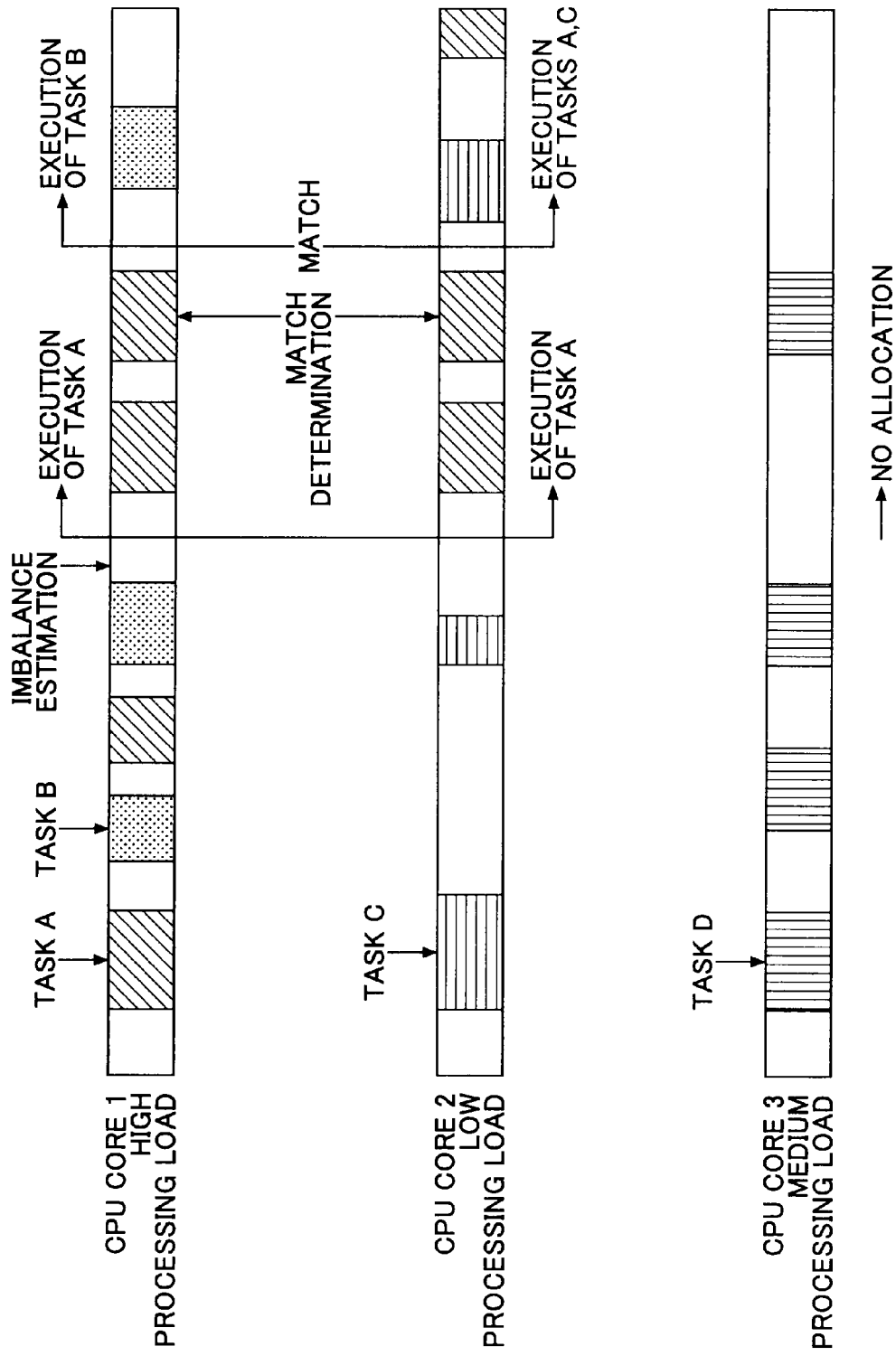
FIG. 8 is an example of a diagram diagrammatically showing an equalization of processing loads among three or more CPU cores.

In FIG. 7, although the case where there are two CPU cores is described, if each of three or more CPU cores executes each task, the dispatcher 33 allocates a task which a CPU core with the highest processing load is executing to a CPU core with the lowest processing load. FIG. 8 is an example of a diagram diagrammatically showing an equalization of processing loads in the case where there are three or more CPU cores. In FIG. 8, the CPU core 1 has a high processing load, the CPU core 2 has a low processing load, and the CPU core 3 has a medium processing load. In this case, the dispatcher 33 allocates the task A or the task B which the CPU core 1 has been executing, to the CPU core 2.

There are some cases where the multi core system 100 can stop the CPU core 2 and reduce power consumption not by equalizing but by allocating the task C which the CPU core 2 has been executing, to the CPU core 3 with the medium processing load. Whether equalizing or attempting to reduce power consumption can be decided depending on the extent of the processing load of the CPU core 1, the extent of the processing load of the CPU core 3 when the CPU core 2 has been stopped, or the like.

In the case of the dynamic determination method, the multi core system 100 can cause the CPU core 2 to trial-execute the task A in addition to the CPU core 1 which is executing the task A. In the case of the static determination method, the multi core system 100 determines a task to be trial-executed by the CPU core 2. In the case of the static determination method, the dispatcher 33 refers to the priority table 34 and selects a task which is supposed to be preferentially allocated to the CPU core 2 with the lowest processing load and which is presently allocated to the CPU core 1 with the highest processing load. Then, the dispatcher 33 causes both the CPU core 1 with the highest processing load and the CPU core 2 with the lowest processing load to trial-execute the task. Determining the task to be trial-executed based on the priority table 34 facilitates the equalization of the processing loads.

Referring again to the step S11, if the load estimating part 32 does not detect the imbalance estimation state (NO in S11), the load estimating part 32 determines whether the processing load of the CPU core 2 is low (S110). A threshold value of this determination is set so that the processing load of the CPU core 1 does not become high even if the CPU core 2 is stopped and the CPU core 1 executes the task. Thus, each threshold value for determining the usage rate $R_1$, the number of tasks $N_1$, or the vehicle status value $S$ is less than $T_{R1}$, $T_{N1}$, or $T_S$, respectively.

If the processing load of the CPU core 2 is low (YES in S110), the multi core system 100 can stop the CPU core 2 according to the similar procedure as in the case where the high load estimation state has been detected.

Specifically, the load estimating part 32 requests the dispatcher 33 to trial-execute a task. According to either the static or the dynamic method, the dispatcher 33 determines the task A as a task to be allocated and causes the CPU core 1 to trial-execute the task A. If the CPU core 2 is not executing the task A, the dispatcher 33 causes the CPU core 2 to trial-execute the task A (S120). When causing the CPU core 1 to trial-execute the task A, the enablement/disenablement switching part 35 prohibits the CPU core 1 from outputting the execution result. If the execution of the task A by the CPU core 2 is not based on the actual demand, the enablement/disenablement switching part 35 prohibits the CPU core 2 from outputting the execution result.

Then, the match determining part 36 compares the execution result of the task A by CPU core 1 and the execution result of the task A by CPU core 2 (S130). The match determining part 36 refers to the match determination table 37 and determines whether there is a match depending on whether the difference is within the allowable range (S140).

If the execution result of the task A by the CPU core 1 matches the execution result of the task A by the CPU core 2 (YES in S140), the allocation fixing part 38 fixes the CPU core 1 as a CPU core to which the task A is allocated (S150). In this way, the dispatcher 33 stops the allocation of the task A to the CPU core 2, the enablement/disenablement switching part 35 permits the CPU core 1 to output the execution result of the task A, and the task scheduler 31 deletes the task A from the task queue of the CPU core 2 and registers the task A, which was deleted, into the task queue of the CPU core 1.

The multi core system 100 stops the CPU core 2 by, for example, terminating providing a clock. Thus, the multi core system 100 can reduce power consumption. In this way, the multi core system 100 can reduce power consumption by stopping the CPU core 2 with the low processing load.

If the execution result of the task A by the CPU core 1 does not match the execution result of the task A by the CPU core 2 (NO in S140), the match determining part 36 continues to compare the execution results of the repeatedly executed task A until the maximum standby time of the task A stored in the match determination table 37 expires. The standby can facilitate reducing power consumption.

As described above, the multi core system 100 of the present embodiment can switch a CPU core which executes a task generated from the control system program without abrupt change in the execution result of the task.

[Second Embodiment]

The multi core system 100 in the first embodiment waits until the execution result by the CPU core 1 matches the execution result by the CPU core 2 up to a maximum standby time. However, in the load distribution, it is preferable to allocate the task A which, for example, the CPU core 1 with high processing load has been executing, to another CPU core (the CPU core 2) as early as possible.

If there is a plurality of CPU cores 1-$n$, it is common that a task is allocated to a CPU core with the lowest processing load in order to distribute the processing loads. However, for a task in the control system, it is necessary to switch an allocation of the task while maintaining the continuity of the control. Thus, from the standpoint of a speedy distribution of the processing loads, it can be preferable to select a CPU core to be allocated rather than to allocate the task to a CPU core with a low processing load. That is, even if a processing load is somewhat high, the earliest CPU core which can obtain a matching execution result can be more optimal as a CPU core to which a task is allocated than a CPU core which is determined by allocating the task to a CPU core with a low processing load and waiting until the execution result matches.

Thus, the present embodiment describes the multi core system 100 which allocates a task to the earliest CPU core whose execution result matches if there is a plurality of CPU cores 1~$n$ to which the task can be allocated.

Figure 9:
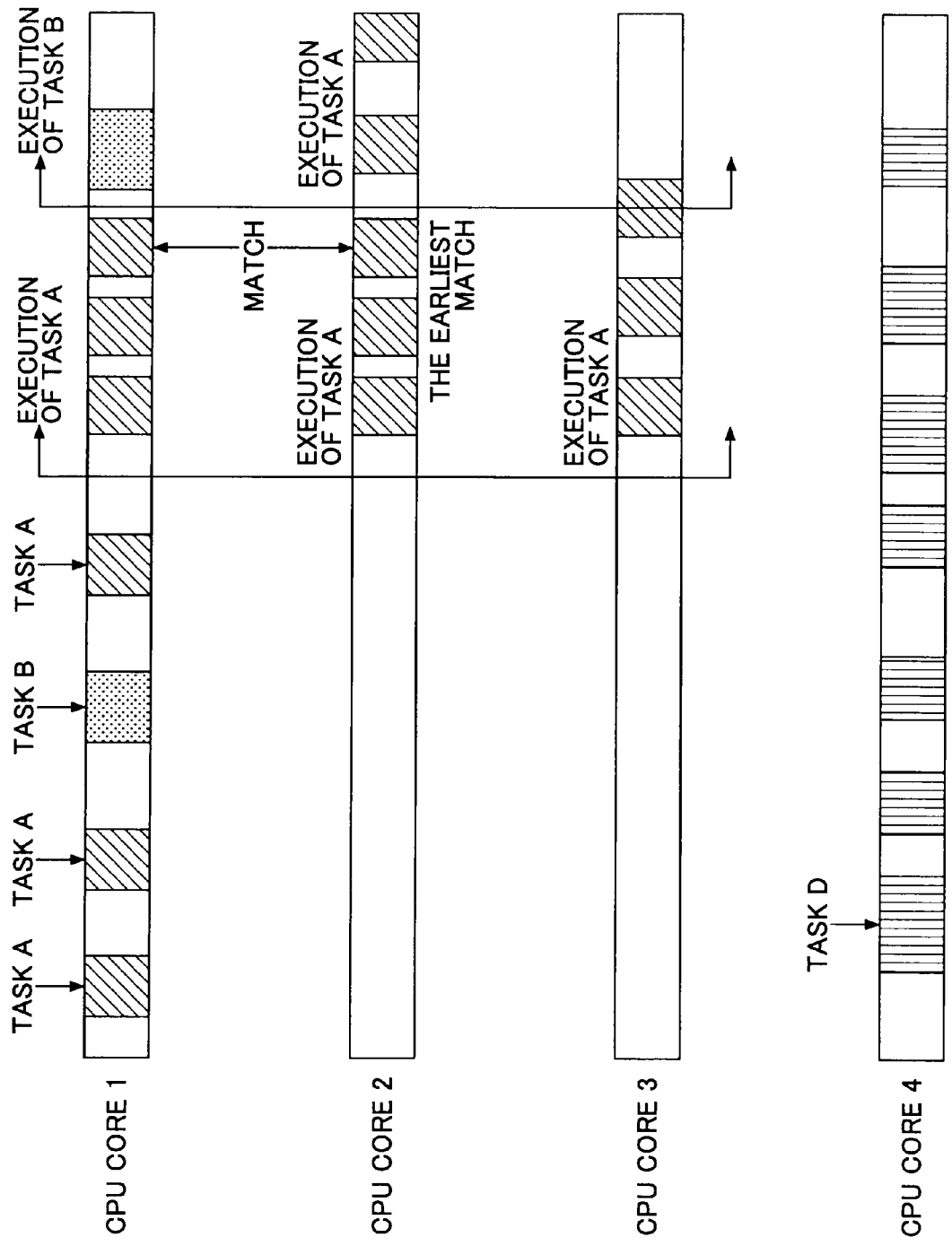
FIG. 9 is an example of a diagram diagrammatically illustrating load distribution by a multi core system (a second embodiment).

FIG. 9 shows an example diagrammatically illustrating load distribution by the multi core system 100 of the present embodiment. The multi core system 100 of the present embodiment causes a plurality of CPU cores 1~$n$ to trial-execute the same task, and fixes the earliest CPU core whose execution result matches among the CPU cores 1~$n$ as a CPU core to which the task is allocated.

In FIG. 9, the multi core system 100 has four CPU cores 1~4. The CPU core 1 executes the task A and the task B, while the CPU core 4 executes the task D, respectively. If a processing load of the CPU core 1 becomes high, similar to the first embodiment, for example, the dispatcher 33 causes the CPU core 2 and the CPU core 3 to trial-execute the task A. The load estimating part 32 monitors respective processing loads of respective CPU cores 1-$n$, extracts one or more CPU cores whose processing loads are less than or equal to a predetermined value, and informs the dispatcher 33 of the result of the extraction. In FIG. 9, since a processing load of the CPU core 4 is high, the dispatcher 33 causes the CPU core 4 to not trial-execute the task A.

The match determining part 36 compares the execution result of the task A by the CPU core 1 and the execution result of the task A by the CPU core 2, and compares the execution result of the task A by the CPU core 1 and the execution result of the task A by the CPU core 3. Then, the match determining part 36 detects the earliest CPU core whose execution result matches the execution result of the task A by the CPU core 1 among the CPU cores 1~$n$. The allocation fixing part 38 fixes the earliest CPU core (CPU core 2) whose execution result has matched as the CPU core to which the task A is allocated.

In this way, the multi core system 100 can reduce time to fix a CPU core to which the task is allocated, and reduce the risk of instability in control when the multi core system 100 distributes processing loads among a plurality of CPU cores 1~$n$.

[Functional Block of the Multi Core System 100]

Figure 10:
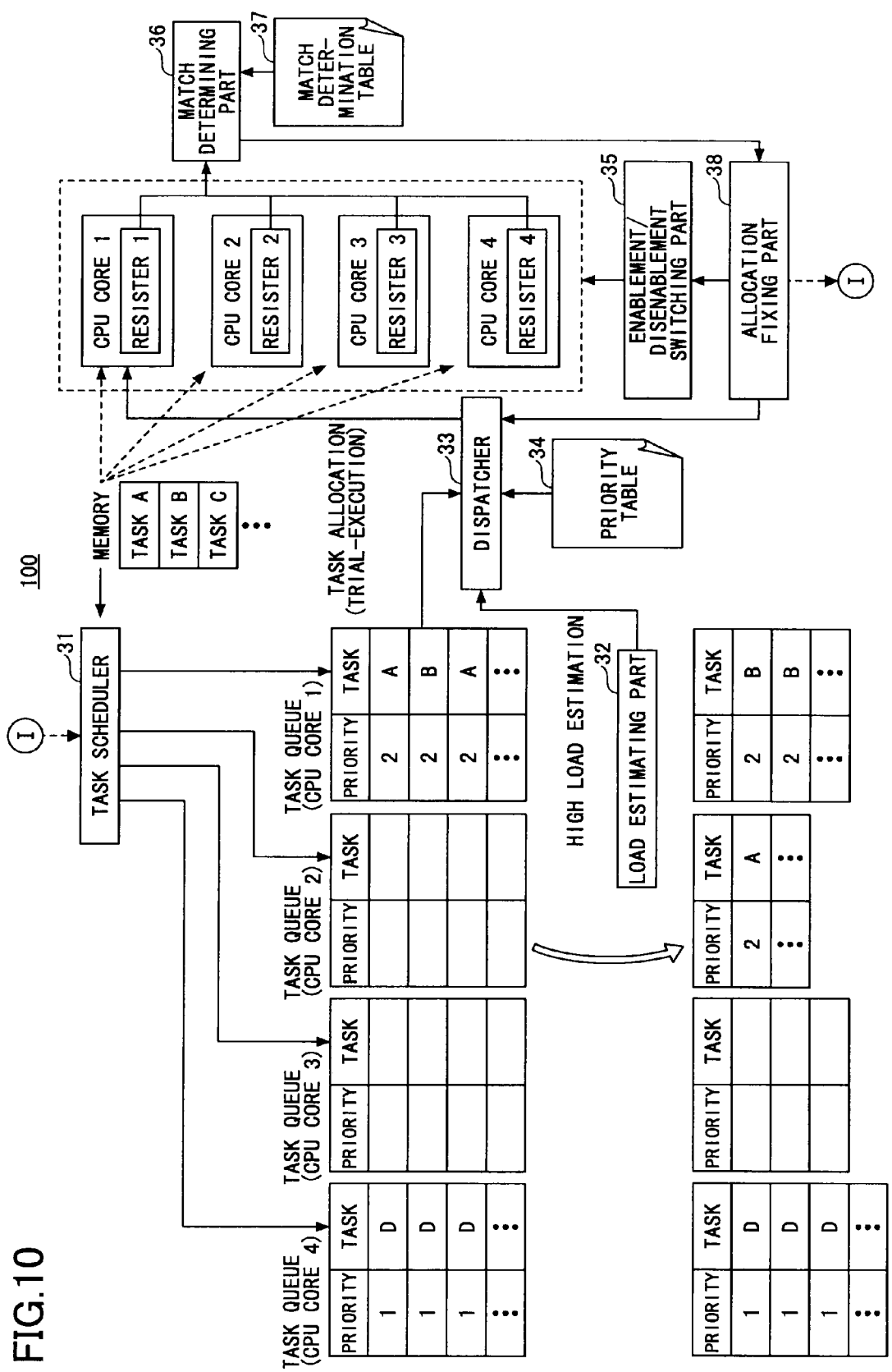
FIG. 10 is an example of a functional block diagram of a multi core system (the second embodiment).

FIG. 10 shows an example of a functional block diagram of the multi core system 100 of the present embodiment. In FIG. 10, like parts are referenced by like reference numbers and the explanation thereof is omitted. The load estimating part 32 monitors processing loads of all of CPU cores 1~$n$. The load estimating part 32 detects whether any of processing loads of the CPU cores 1~$n$ has become high, or whether there is a possibility that any of processing loads of the CPU cores 1~$n$ may become high. In the present embodiment, it will be assumed that the high load estimation state is synonymous with the imbalance estimation state. This is because it is rare that the high load estimation states are uniformly detected in processing loads of all CPU cores 1~$n$. If the load estimating part 32 detects the high load estimation state in, for example, the CPU core 1, the load estimating part 32 determines, for example, the CPU core 2 and the CPU core 3 whose processing loads are less than or equal to the predetermined value as CPU core candidates to which the task A is allocated.

The dispatcher 33 causes the CPU core 2 and the CPU core 3 determined as the candidates to trial-execute the task A, respectively. If the CPU core 1 with high processing load has not yet executed the task A, the dispatcher 33 causes the CPU core 1 to trial-execute the task A. In this way, each of the CPU cores 1~3 execute the task A. Since a time when each of the CPU core 2 and the CPU core 3 starts executing the task A is determined according to each of processing statuses of the CPU core 2 and the CPU core 3, it is not always the case that each of the CPU core 2 and the CPU core 3 starts executing the task A simultaneously.

Then, the match determining part 36 of the present embodiment compares the execution result of the task A by the CPU core 1 with high processing load and the execution result of the task A by the CPU core 2 to which the task A is allocated for determination, and compares the execution result of the task A by the CPU core 1 with high processing load and the execution result of the task A by the CPU core 3 to which the task A is allocated for determination, respectively. The match determining part 36 informs the allocation fixing part 38 of identification information of, for example, the earliest CPU core 2 whose execution result matches.

The allocation fixing part 38 fixes the CPU core 2 as the CPU core to which the task A is allocated. The allocation fixing part 38 informs the enablement/disenablement switching part 35, the dispatcher 33, and the task scheduler 31 of the identification information of the fixed CPU core 2. As a result, the enablement/disenablement switching part 35 permits the CPU core 2 to output the execution result. The dispatcher 33 forcibly terminates the task A which the CPU core 1 and the CPU core 3 have been executing. The task scheduler 31 deletes the task A from the task queue of the CPU core 1 and registers the task A, which was deleted, into the task queue of the CPU core 2.

In this way, the multi core system 100 can fix the earliest CPU core 2 whose execution result of the task A matches the execution result of the task A by the CPU core 1 with high processing load as a CPU core to which the task A is allocated, and reduce time to fix the CPU core to which the task A is allocated.

[Processing Procedure of the Multi Core System 100]

Figure 11:
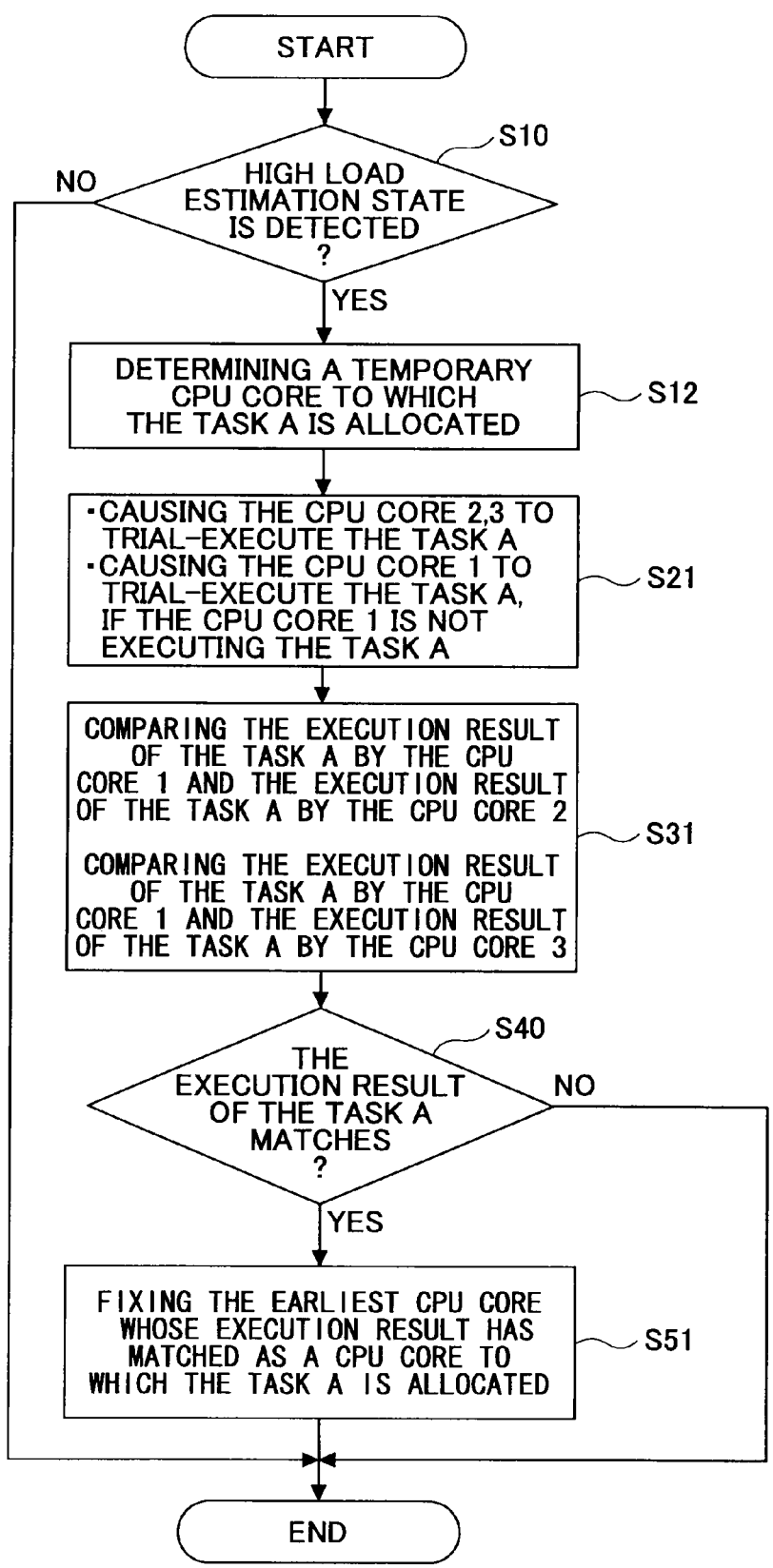
FIG. 11 is an example of a flow chart showing a procedure where a multi core system determines to allocate a task A to the CPU core 2 which is the first core whose execution result of the task A has matched the execution result by the highly-loaded CPU core 1.

FIG. 11 shows an example of a flow chart indicating a procedure in which the multi core system 100 fixes the earliest CPU core 2 whose execution result of the task A matches the execution result of the task A by the CPU core 1 with high processing load as a CPU core to which the task A is allocated. The CPU cores 1~4 may already have been initiated or may not have been initiated.

The load estimating part 32 constantly monitors the processing loads of the CPU cores 1~4. The load estimating part 32 determines whether the processing loads have become high or whether there is a possibility that the processing loads may become high (S10). If the high load estimation state is not detected (NO in S10), the procedure in FIG. 11 terminates. This is because there is no need to distribute the processing loads.

If the high load estimation state is detected (YES in S10), the load estimating part 32 determines a temporary CPU core to which the task A is allocated (S12). The temporary CPU core can be the CPU cores 2, 3 whose processing load is less than or equal to a predetermined value.

The dispatcher 33 causes the CPU core 2 and the CPU core 3 to trial-execute the task A by use of either the static or the dynamic method (S21). If the CPU core 1 with high processing load is not executing the task A, the dispatcher 33 causes the CPU core 1 to trial-execute the task A.

If the dispatcher 33 causes the CPU cores 2 and the CPU core 3 to trial-execute the task A, the enablement/disenablement switching part 35 prohibits each of the CPU cores 2 and 3 from outputting the execution result. If the execution of the task A by the CPU core 1 is not based on an actual demand, the enablement/disenablement switching part 35 prohibits the CPU core 1 from outputting the execution result.

Then, the match determining part 36 compares the execution result of the task A by the CPU core 1 and the execution result of the task A by the CPU core 2, and compares the execution result of the task A by the CPU core 1 and the execution result of the task A by the CPU core 3 (S31). The match determining part 36 refers to the match determination table 37 and determines whether there is a match, depending on whether the difference is within the allowable range (S40).

If the execution result of the task A by the CPU core 2 is the earliest execution result which has matched the execution result of the task A by the CPU core 1 (YES in S40), the allocation fixing part 38 fixes the CPU core 2 as a CPU core to which the task A is allocated, while if the execution result of the task A by the CPU core 3 is the earliest execution result which has matched the execution result of the task A by the CPU core 1 (YES in S40), the allocation fixing part 38 fixes the CPU core 3 as a CPU core to which the task A is allocated (S51). The determination whether there is a match is repeated as in the first embodiment until the maximum standby time expires.

The allocation fixing part 38 informs the enablement/disenablement switching part 35, the dispatcher 33, and the task scheduler 31 of the fixed CPU core. As a result, the enablement/disenablement switching part 35 permits the CPU core 2 to output the execution result. The dispatcher 33 forcibly terminates the task A which the CPU core 1 and the CPU core 3 have been executing. The task scheduler 31 deletes the task A from the task queue of the CPU core 1 and registers the task A, which was deleted, into the task queue of the CPU core 2.

The multi core system 100 of the present embodiment can reduce time to fix a CPU core to which a task is allocated, and reduce risk of instability in control when the multi core system 100 distributes processing loads among a plurality of CPU cores.

The present international application claims priority from Japanese Patent Application No. 2008-188830 filed on Jul. 22, 2008, which is entirely incorporated herein by reference.

The invention claimed is:

1. A multi core system for allocating a task generated from a control system program to a CPU core and executing the task, comprising:

a trial-execution instructing part configured to cause a second CPU core to trial-execute a task which a first CPU core repeatedly executes before the multi core system transfers the task from the first CPU core to the second CPU core and causes the second CPU core to repeatedly execute the task;

a determining part configured to determine whether a execution result by the first CPU core, which affects a next execution result of the control system program, matches a trial-execution result by the second CPU core, which does not affect the next execution result of the control system program; and an allocation fixing part configured to fix the second CPU core as the CPU core to which the task is allocated if the determining part determines that the execution result by the first CPU core matches the trial-execution result by the second CPU core, wherein the task remains allocated to the first CPU core when the determining part determines that the execution result by the first CPU core does not match the trial-execution result by the second CPU core.

2. A multi core system according to claim 1, wherein:

the trial-execution instructing part is configured to cause two or more second CPU cores to trial-execute the task, the determining part is configured to compare the execution result by the first CPU core and each of the trial-execution results by the two or more second CPU cores, and the allocation fixing part is configured to fix a CPU core having the earliest trial-execution result among the two or more second CPU cores as the CPU core to which the task is allocated, wherein the earliest trial-execution result matches the execution result by the first CPU core.

3. A multi core system according to claim 1, further comprising a processing load detecting part configured to detect a processing load of the first CPU core, wherein:

the trial-execution instructing part is configured to cause the second CPU core to trial-execute the task when the processing load detecting part detects that a processing load of the first CPU core has become high or that there is a possibility that a processing load of the first CPU core will become high.

4. A multi core system according to claim 3, wherein:

the processing load detecting part is configured to detect that the processing load of the first CPU core is greater than a first threshold value if at least one of conditions is met, the conditions being that a CPU core usage rate representing a rate of an execution time period of the task with respect to a predetermined time period is greater than a threshold value $T_{R1}$, and that the number of tasks in standby is greater than a threshold value $T_{N1}$, and the processing load detecting part is configured to detect that the processing load of the first CPU core will become greater than the first threshold value if at least one of conditions is met, the conditions being that an increasing rate of the CPU core usage rate is greater than a threshold value $T_{dR1}$, and that an increasing rate of the number of tasks in standby is greater than a threshold value $T_{dN1}$.

5. A multi core system according to claim 3, wherein:

the processing load detecting part is configured to detect that the processing load of the first CPU core is greater than a threshold value if a status value representing a state of a vehicle is greater than a threshold value $T_s$, and the processing load detecting part is configured to detect that the processing load of the first CPU core will become greater than the threshold value if an increasing rate of the status value representing a state of a vehicle is greater than a threshold value $T_{dS}$.

6. A multi core system according to claim 3, wherein:
comprising a processing load detecting part configured to detect a processing load of the second CPU core,
the trial-execution instructing part is configured to cause the first CPU core and the second CPU core to trial-execute the task which the second CPU core executes if the processing load detecting part detects that the processing load of the second CPU core is lower than a threshold value,
the determining part is configured to determine whether the trial-execution result by the first CPU core matches the trial-execution result by the second CPU core,
the multi core system is configured to switch a CPU core for executing the task from the second CPU core to the first CPU core, and stop the second CPU core if the determining part determines that the trial-execution result by the first CPU core matches the trial-execution result by the second CPU core.

7. A multi core system according to claim 1, wherein:
the trial-execution instructing part is configured to cause the first CPU core to trial-execute the task when the first CPU core is not executing the task.

8. A multi core system according to claim 1, further comprising a processing load detecting part configured to detect processing loads of the first CPU core and the second CPU core,
wherein:
the trial-execution instructing part is configured to cause the first CPU core and the second CPU core to trial-execute the task which the first CPU core or the second CPU core having a higher processing load have been executing when the processing load detecting part detects an imbalance or the possibility of an imbalance between the processing load of the first CPU core and the processing load of the second CPU core.

9. A multi core system according to claim 8, wherein:
the processing load detecting part is configured to detect the imbalance between the processing load of the first CPU core and the processing load of the second CPU core if at least one of conditions is met, the conditions being that a difference between a CPU core usage rate of the first CPU core representing a rate of an execution time period of the task with respect to a predetermined time period and a CPU core usage rate of the second CPU core is greater than a threshold value $T_{R12}$, and that a difference between the number of tasks waiting for an execution by the first CPU core and the number of tasks waiting for an execution by the second CPU core is greater than a threshold value $T_{N12}$, and
the processing load detecting part is configured to detect the possibility of an imbalance between the processing load of the first CPU core and the processing load of the second CPU core if at least one of conditions is met, the conditions being that an increasing rate of the difference between the CPU usage rate of the first CPU core and the CPU usage rate of the second CPU core is greater than a threshold value $T_{dR12}$, and that an increasing rate of the difference between the number of tasks waiting for an execution by the first CPU core and the number of tasks waiting for an execution by the second CPU core is greater than a threshold value $T_{dN12}$.

10. A multi core system according to claim 1, wherein:
the determining part is configured to determine that the trial-execution result by the first CPU core matches the execution result by the second CPU core if a difference between the execution result by the first CPU core and the trial-execution result by the second CPU core is within a predetermined range.

11. A multi core system according to claim 10, wherein:
the difference is predetermined depending on the task.

12. A multi core system according to claim 1, wherein:
the determining part is configured to, in the event the execution result by the first CPU core does not match the trial-execution result by the second CPU core, repeat determining until the execution result by the first CPU core matches the trial-execution result by the second CPU core within a predetermined standby time.

13. A multi core system according to claim 1, further comprising a priority table configured to register the CPU core to which the task is allocated in relation to the task,
wherein:
the trial-execution instructing part is configured to refer to the priority table to determine a CPU for core trial-executing the task.

14. A multi core system according to claim 1, comprising a processing load detecting part configured to detect processing loads of CPU cores, wherein
a task which the trial-execution instructing part causes the second CPU core to trial-execute is a task which the first CPU core is executing when the processing load detecting part has detected that a processing load of the first CPU core has become greater than a first threshold value or the processing load detecting part has detected that there is a possibility that a processing load of the first CPU core will become greater than the first threshold value, or when the processing load detecting part has detected an imbalance or the possibility of an imbalance among processing loads of a plurality of CPU cores.

15. A multi core system according to claim 14, wherein:
the first CPU core is configured to output to a controlled object an execution result of the task which the first CPU core is executing when the processing load detecting part has detected that a processing load of the first CPU core has become greater than a first threshold value or the processing load detecting part has detected that there is a possibility that a processing load of the first CPU core will become greater than the first threshold value, or when the processing load detecting part has detected an imbalance or the possibility of an imbalance among processing loads of a plurality of CPU cores.

16. A multi core system according to claim 1, in combination with a control system program, wherein:
the control system program is a program utilizing a previous execution result for an execution of a next task.

17. The multi core system according to claim 1, further comprising:
an inter-operating system communicating part to exchange information between a first operating system and a second operating system.

18. A vehicular electronic control unit, comprising:
a trial-execution instructing part configured to cause a second CPU core to trial-execute a task which a first CPU core repeatedly executes before a multi core system transfers the task from the first CPU core to the second CPU core and causes the second CPU core to repeatedly execute the task;
a determining part configured to determine whether a execution result by the first CPU core, which affects a next execution result of the control system program, matches a trial-execution result by the second CPU core, which does not affect the next execution result of the control system program;

an allocation fixing part configured to fix the second CPU core as a CPU core to which the task is allocated if the determining part determines that the execution result by the first CPU core matches the trial-execution result by the second CPU core;

a storing part configured to store the control system program; and an interface connected to an actuator, wherein the task remains allocated to the first CPU core when the determining part determines that the execution result of the first CPU core does not match the trial-execution result of the second CPU core.

19. The multi core system according to claim 18, further comprising:

a switching part to prevent the trial-execution result of the second CPU core from being provided to the interface.

20. A task switching method of a multi core system for allocating a task generated from a control system program to a CPU core and executing the task, comprising:

causing, by a trial-execution instructing part, a first CPU core and a second CPU core to trial-execute a task which the first CPU core repeatedly executes to output an execution result affecting a next execution result of the control system program, before the multi core system transfers the task from the first CPU core to the second CPU core and causes the second CPU core to repeatedly execute the task;

determining, in a determining part, whether a trial-execution result by the first CPU core, which does not affect a next execution result of the control system program, matches a trial-execution result by the second CPU core, which does not affect a next execution result of the control system program; and fixing, in an allocation fixing part, the second CPU core as the CPU core to which the task is allocated if the determining part determines that the trial-execution result by the first CPU core matches the trial-execution result by the second CPU core, the task remaining allocated to the first CPU core when the trial-execution result by the first CPU core does not match the trial-execution result of the second CPU core.

* * * * *